United States Patent
Nakano

(10) Patent No.: US 8,220,911 B2
(45) Date of Patent: Jul. 17, 2012

US008220911B2

(54) INKJET RECORDING METHOD

(75) Inventor: Ryoichi Nakano, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 663 days.

(21) Appl. No.: 12/396,588

(22) Filed: Mar. 3, 2009

(65) Prior Publication Data

US 2009/0231402 A1 Sep. 17, 2009

(30) Foreign Application Priority Data

Mar. 13, 2008 (JP) ................................. 2008-064543

(51) Int. Cl.
*C09D 11/00* (2006.01)
(52) U.S. Cl. ................... 347/100; 106/31.13; 428/32.35
(58) Field of Classification Search .................. 347/101, 347/105, 106, 95–100; 428/32.28, 32.35, 428/32.37; 106/31.13, 31.27; 523/160, 161
See application file for complete search history.

(56) References Cited

U.S. PATENT DOCUMENTS

| | | | | |
|---|---|---|---|---|
| 4,853,037 A | * | 8/1989 | Johnson et al. | 106/31.43 |
| 5,993,924 A | * | 11/1999 | Deroch et al. | 428/36.91 |
| 7,223,453 B2 | * | 5/2007 | Takashima et al. | 428/32.3 |
| 2002/0107301 A1 | * | 8/2002 | Yamanouchi et al. | 523/160 |
| 2003/0186003 A1 | * | 10/2003 | Nakano et al. | 428/32.1 |
| 2005/0233097 A1 | * | 10/2005 | Tojo et al. | 428/32.26 |
| 2007/0003714 A1 | * | 1/2007 | Nakano et al. | 428/32.28 |
| 2007/0087936 A1 | * | 4/2007 | Shiratsuchi et al. | 503/201 |
| 2007/0166474 A1 | * | 7/2007 | Nakano et al. | 427/407.1 |
| 2007/0237911 A1 | * | 10/2007 | Nakano | 428/32.34 |
| 2010/0080909 A1 | * | 4/2010 | Nakano | 427/256 |

FOREIGN PATENT DOCUMENTS

| | | |
|---|---|---|
| JP | 6-32047 A | 2/1994 |
| JP | 2003-96362 A | 4/2003 |
| JP | 2004-1469 A | 1/2004 |
| JP | 2006-16455 A | 1/2006 |

* cited by examiner

*Primary Examiner* — Matthew Luu
*Assistant Examiner* — Rut Patel
(74) *Attorney, Agent, or Firm* — Sughrue Mion, PLLC

(57) ABSTRACT

An inkjet recording method includes forming an image on an inkjet recording sheet with an ink set, wherein the inkjet recording sheet includes: a support; and a colorant-receiving layer provided on the support, the colorant receiving layer including inorganic particles, a water-soluble resin and at least one boron compound selected from the group consisting of boric acid, borate and borax, in which the ratio of the boron compound to the water-soluble resin is from 5 to 14% by mass, wherein the ink set including at least one inkjet ink including at least the boron compound and a water-soluble dye, and wherein the image is formed on a side of the inkjet recording sheet at which the colorant-receiving layer is formed.

16 Claims, No Drawings

INKJET RECORDING METHOD

CROSS-REFERENCE TO RELATED APPLICATION

This application claims priority under 35 USC 119 from Japanese Patent Application No. 2008-064543, the disclosure of which is incorporated by reference herein.

BACKGROUND OF THE INVENTION

1. Field of the Invention

The present invention relates to an inkjet recording method.

2. Description of the Related Art

With recent rapid advances in the information technology industry, various types of information processing systems have been developed, and recording methods and recording devices suitable for the respective information processing systems have been put to practical use. Among these, inkjet recording methods have been widely used because it is possible to record on various kinds of recording materials thereby, the hardware (devices) is relatively cheap and compact and the methods are favorably quiet in operation. Furthermore, in recording that uses an inkjet recording method, it has become possible to obtain "photograph-like" high quality recorded matter.

A recording material for inkjet recording is generally required to have characteristics including (1) quick-drying property (high absorption speed of ink), (2) an adequate and uniform dot diameter (free from blurring), (3) excellent granularity, (4) high dot sphericity, (5) high color density, (6) high color saturation (no dullness), (7) excellent water resistance, weather resistance and ozone resistance of an image portion, (8) high whiteness, (9) high storage stability (free from yellowing and blurring of an image during long-term storage), (10) resistance to deformation; that is, high dimensional stability (low curling) and (11) excellent hardware operability.

In consideration of the foregoing, a recording material in which an ink-receiving layer has a porous structure has been recently put to practical use. Such a recording material is said to have excellent quick-drying property and high glossiness. However, higher quality is always demanded for recorded images. In particular, the requirements for color density and tincture of images are particularly strict. For example, it is important that a high density region has a deep color in view of contrast of image and sharpness in shading, and that bronzing is inhibited from occurring in view of hue and color.

In order to provide a recording method capable of reproducing images of excellent color, a recording method has been disclosed in which an image is formed on a recording material having a recording layer, to which a water-soluble high molecular substance having a hydroxyl group has been applied, by use of an inkjet recording method that uses an aqueous ink that contains a water-dispersible or water-soluble colorant, a wetting agent, boric acid or a borate, and water and has the surface tension of 50 mJ/m$^2$ or less and a pH of 8 or more (see, for instance, Japanese Patent Application Laid-Open (JP-A) No. 06-032047).

In order to provide an ink with which blurring at boundaries is suppressed and, consequently, inkjet recording capable of high-speed printing and photograph-like image quality is realized, an ink having a boron content in the range of from 10 ppb to 30 ppb has been disclosed (see, for instance, JP-A No. 2003-096362).

In order to provide an ink composition for inkjet recording, which enables recording of images having particularly high light resistance, high ozone resistance and high scratch resistance, an ink composition for inkjet recording, which contains at least an ethylenically unsaturated monomer, a dye having an oxidation potential nobler than 1.0 V (vs SCE) and an organic boron compound has been disclosed (see, for instance, JP-A No. 2006-016455).

In order to provide an inkjet recording method that enables formation of an image having excellent gas fastness and light fastness, an inkjet recording method has been disclosed in which an ink set that contains at least a yellow ink containing at least one yellow dye, a magenta ink containing at least one magenta dye and a cyan ink containing at least one cyan dye and in which the respective oxidation potentials of the magenta and cyan dyes are nobler than 0.8V (vs SCE), is applied to an ink jet recording sheet including a support and, on the support, a colorant-receiving layer containing at least one inorganic mordant, to form an image (see, for instance, JP-A No. 2004-001469).

However, even in the existing technologies, occurrence of bronzing has been difficult to suppress in some cases. Furthermore, there are cases in which photograph-like image quality is difficult to obtain due to a significant difference in glossiness between an image portion formed with the inkjet ink and a non-image portion.

SUMMARY OF THE INVENTION

The present invention is intended to provide an inkjet recording method that is capable of suppressing the occurrence of bronzing and of a difference in glossiness between an image portion and a non-image portion.

According to an aspect of the invention, an inkjet recording method is provided, which includes: forming an image on an inkjet recording sheet with an ink set, wherein the inkjet recording sheet includes: a support; and a colorant-receiving layer provided on the support, the colorant receiving layer including inorganic particles, a water-soluble resin and at least one boron compound selected from the group consisting of boric acid, a borate and borax, and the ratio of the boron compound to the water-soluble resin in the colorant-receiving layer being from 5 to 14% by mass, wherein the ink set includes at least one inkjet ink including at least the at least one boron compound and a water-soluble dye, and wherein the image is formed on a side of the inkjet recording sheet at which the colorant-receiving layer is formed.

DETAILED DESCRIPTION OF THE INVENTION

In the following, an inkjet recording method according to an exemplary embodiment of the invention will be described in detail.

In an inkjet recording method according to the exemplary embodiment of the invention, an ink set including at least one inkjet ink including at least a boron compound selected from the group consisting of boric acid, a borate and borax, and a water-soluble dye is used to form an image on an inkjet recording sheet on a side of a support at which a colorant-receiving layer is formed, the inkjet recording sheet including the support and, on the support, the colorant-receiving layer, which includes at least inorganic fine particles, a water-soluble resin and the boron compound, the ratio of the boron compound to the water-soluble resin (boron compound/water-soluble resin) being from 5% by mass to 14% by mass.

According to the inkjet recording method of the exemplary embodiment, bronzing and a difference in glossiness between an image portion and a non-image portion may be inhibited from occurring.

The reason why a difference in glossiness between an image portion and a non-image portion is suppressed is not clear. However, the reason is assumed to be as follows. When an ink droplet impacts on a side at which the colorant-receiving layer of the inkjet recording sheet is formed in order to form an image, the portion of the colorant-receiving layer at which the ink droplet impacts (image portion) absorbs a solvent included in the ink and swells. As a result, difference in glossiness is generated between an image portion and a non-image portion on the colorant-receiving layer surface. The swelling of the colorant-receiving layer can be quite pronounced in a colorant-receiving layer formed by curing a water-soluble resin such as polyvinyl alcohol with only a small amount of a boron compound. In the inkjet recording method according to the exemplary embodiment of the invention, a sufficient amount of a boron compound is used to cure the water-soluble resin, whereby the colorant-receiving layer is thoroughly cured. Furthermore, since a boron compound is added to the ink, the amount of the boron compound in an image portion of the colorant-receiving layer becomes larger than that in a non-image portion; accordingly, the image portion is more securely cured. As the result, it is thought that swelling of the image portion is suppressed, and the difference in glossiness between an image portion and a non-image portion is reduced.

Meanwhile, the reason why bronzing is suppressed is also not clear but is thought to be as follows. It is thought that bronzing is caused by association of the dye included in the ink. Herein, when the colorant-receiving layer swells greatly, voids formed from inorganic fine particles and the water-soluble resin in the colorant-receiving layer are clogged; as a result, ink absorption of the colorant-receiving layer deteriorates. Thereby, ink droplets are not easily absorbed by the colorant-receiving layer and tend to localize on a surface of the colorant-receiving layer. Similarly, the dye included in the ink also localizes on a surface of the colorant-receiving layer; accordingly, the dye tends to associate on the surface of the colorant-receiving layer, resulting in the occurrence of bronzing. According to the inkjet recording method of the exemplary embodiment, the image portion is suppressed from swelling as mentioned above; accordingly, ink droplets are sufficiently absorbed by the colorant-receiving layer. As the result, it is inferred that the dye is inhibited from associating on a surface of the colorant-receiving layer, which results in suppression of bronzing.

Hereinafter, respective components of an ink set and an inkjet recording sheet used in the inkjet recording method of the invention will be described.

Ink Set

The ink set used in the invention includes at least one inkjet ink including at least one boron compound selected from the group consisting of boric acid, a borate and borax, and a water-soluble dye. When the ink set used in the invention is used to form a full color image, a yellow ink containing at least one yellow dye, a magenta ink containing at least one magenta dye and a cyan ink containing at least one cyan ink are prepared as the minimum required components of the ink set, and at least one of the yellow ink, the magenta ink and the cyan ink preferably includes the boron compound and the water-soluble dye. In an exemplary embodiment of the invention, all of the inkjet inks included in the ink set are preferably inkjet inks including at least the boron compound and the water-soluble dye.

Dye

At least one of the inkjet inks included in the ink set used in the invention includes a water-soluble dye and a boron compound. The expression that "water-soluble dye" as used in the invention means that 1% or more of the dye as solid content dissolves in water at 20° C. The water-soluble dye used in the invention is not particularly restricted.

When a water-soluble dye that is represented by the following Formula (C-I) and that tends to exhibit dye association thereby causing bronzing is used as a cyan dye in the invention, a remarkable effect bronzing suppression can be achieved. However, the dye represented by Formula (C-I) need not be a water-soluble dye.

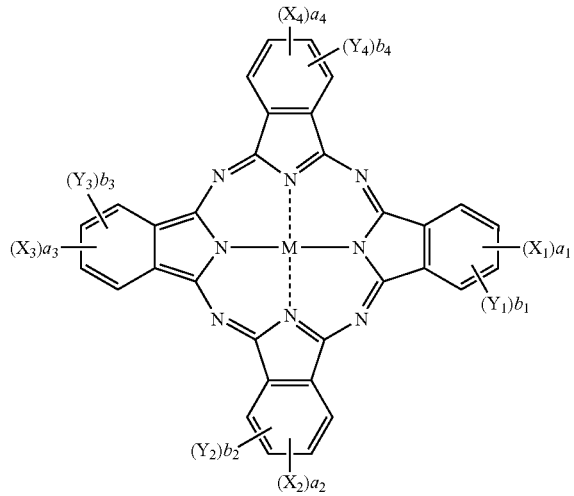

Formula (C-I)

In Formula (C-I), $X_1$, $X_2$, $X_3$ and $X_4$ each independently represent an electron-attracting group having a Hammett's substituent constant σp of 0.40 or more; $Y_1$, $Y_2$, $Y_3$ and $Y_4$ each independently represent a monovalent substituent; M represents a hydrogen atom, a metal element or an oxide, hydroxide or halide thereof; $a_1$ to $a_4$ each represent the number of substituents of $X_1$ to $X_4$; $b_1$ to $b_4$ each represent the number of substituents of $Y_1$ to $Y_4$, respectively; $a_1$ to $a_4$ each independently represent an integer of from 0 to 4; $b_1$ to $b_4$ each independently represent an integer of from 0 to 4; and a sum total of the number represented by $a_1$ to $a_4$ is 2 or more and preferably 3 or more, a case where $a_1=a_2=a_3=a_4=1$ being most preferred. When an ionic hydrophilic group is possessed as a substituent at any one of positions on $X_1$, $X_2$, $X_3$, $X_4$, $Y_1$, $Y_2$, $Y_3$ and $Y_4$, water solubility is imparted to a cyan dye represented by Formula (C-I). Examples of the ionic hydrophilic group as a substituent include a sulfo group, a carboxyl group, a phosphono group and a quaternary ammonium group.

Examples of the substituent having σp of at least 0.40 include a cyano group, a nitro group, a carboxyl group, a sulfo group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphono group, a phosphoryl group, as well as an alkyl group substituted by an electron-attracting group (e.g., a trihalomethyl group, a perfluoroalkyl group, a dicyanomethyl group, an iminomethyl group), an alkenyl group substituted by an electron-attracting group (e.g., a tricyanovinyl group), and a quaternary salt substituent (e.g., a sulfonium group, an ammonium group, a phosphonium group). Of the functional groups mentioned above, those having a hydrogen atom may be further substituted by removing the hydrogen atom and substituting the hydrogen with any of the above-mentioned groups. Examples of the substituents are an alkylcarbonylaminosulfonyl group, an arylcarbonylaminosulfonyl group, an alkylsulfonylaminocarbonyl group, and an arylsulfonylaminocarbonyl group.

The Hammett's substituent constant σp is described briefly. The Hammett's rule is a rule of thumb proposed by L. P. Hammett in 1935 for quantitatively discussing the influence of substituents on the reaction or equilibrium of benzene derivatives, and its reasonableness is widely admitted in the art. The substituent constant to be obtained by the Hammett's rule includes two values σp and σm, and these are seen in many ordinary documents. For example, their details are in Lange's Handbook of Chemistry by J. A. Dean (Ed. 12, 1979, McGraw-Hill); and extra issue of Chemical Region (Kagaku no Ryoiki) (No. 122, pp. 96-103, 1979, Nanko-do).

Of the phthalocyanine dyes represented by Formula (C-I), more preferred are those represented by the following Formula (C-II). The phthalocyanine dyes represented by Formula (C-II) used in the invention are described in detail hereinafter.

Formula (C-II)

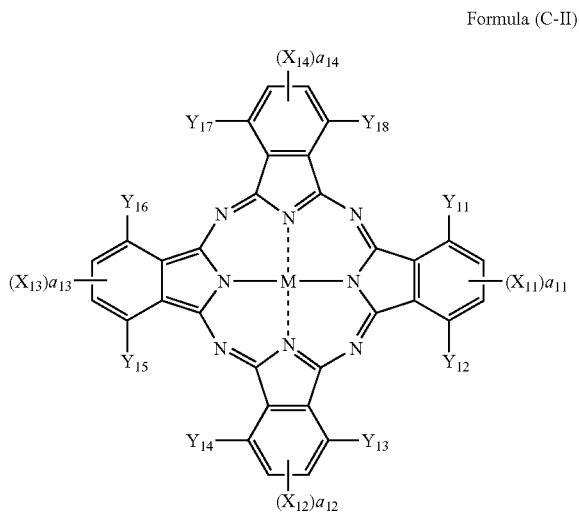

In Formula (C-II), $X_{11}$ to $X_{14}$ each independently represent —SO-Z, —SO$_2$-Z, —SO$_2$NR$_1$R$_2$, a sulfo group, —CONR$_1$R$_2$ or —CO$_2$R$_1$. $Y_{11}$ to $Y_{18}$ each independently represent a monovalent substituent. M represents a hydrogen atom, a metal atom or an oxide, hydroxide or halide thereof. In Formula (C-II), $a_{11}$ to $a_{14}$ each represent the number of the substituents represented by $X_{11}$ to $X_{14}$, respectively; and $a_{11}$ to $a_{14}$ each independently represent an integer of 1 or 2.

Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. R$^1$ and R$^2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

In Formula (C-II), $a_{11}$ to $a_{14}$ each independently represent an integer of 1 or 2. More preferably, $4 \leq a_{11}+a_{12}+a_{13}+a_{14} \leq 6$; and even more preferably $a_{11}=a_{12}=a_{13}=a_{14}=1$.

Each of $X_{11}$, $X_{12}$, $X_{13}$ and $X_{14}$ may be the same, or a part thereof may be the same. For example, each of $X_{11}$, $X_{12}$, $X_{13}$ and $X_{14}$ may represent —SO$_2$-Z, in which, however, Z may respectively differ. In other words, each of $X_{11}$, $X_{12}$, $X_{13}$ and $X_{14}$ may represent the same type of substituent but part of the substituent may be different. Alternatively, $X_{11}$, $X_{12}$, $X_{13}$ and $X_{14}$ may each represent different substituents. For example, $X_{11}$, $X_{12}$, $X_{13}$ and $X_{14}$ may respectively represent different substituents of —SO$_2$-Z and —SO$_2$NR$_1$R$_2$ in the same molecule.

Particularly preferred combinations of the substituents in the phthalocyanine dye represented by Formula (C-II) are described below.

It is preferable that $X_{11}$ to $X_{14}$ each independently represent —SO-Z, —SO$_2$-Z, —SO$_2$NR$_1$R$_2$ or —CONR$_1$R$_2$; more preferably —SO$_2$-Z or —SO$_2$NR$_1$R$_2$; and most preferably —SO$_2$-Z.

It is preferable that Z independently represent a substituted or unsubstituted alkyl group, a substituted or unsubstituted aryl group, or a substituted or unsubstituted heterocyclic group; and most preferably a substituted alkyl group, a substituted aryl group or a substituted heterocyclic group. In particular, from the viewpoint of increasing the dye solubility and the ink stability, it is desirable that the substituent has an asymmetric carbon (and the dye is in the form of racemate). For enhancing the degree of association of the dye to improve the fastness of the ink, it is also desirable that the substituent has at least one of a hydroxyl group, an ether group, an ester group, a cyano group, an amido group and a sulfonamido group.

Preferably, R$_1$ and R$_2$ each independently represent a hydrogen atom, a substituted or unsubstituted alkyl group, a substituted or unsubstituted aryl group, or a substituted or unsubstituted heterocyclic group; most preferably a hydrogen atom, a substituted alkyl group, a substituted aryl group or a substituted heterocyclic group. However, it is undesirable that R$_1$ and R$_2$ are both hydrogen atoms. In particular, for increasing the dye solubility and the ink stability, it is preferable that the substituent has an asymmetric carbon (and the dye is in the form of racemate). For enhancing the degree of association of the dye to improve the fastness of the ink, it is also desirable that the substituent has at least one of a hydroxyl group, an ether group, an ester group, a cyano group, an amido group and a sulfonamido group.

It is preferable that $Y_{11}$ to $Y_{18}$ each independently represent a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group, or a sulfo group, more preferably a hydrogen atom, a halogen atom, a cyano group, a carboxyl group, or a sulfo group, and most preferably a hydrogen atom. It is preferable that $a_{11}$ to $a_{14}$ each independently represent an integer of 1 or 2, and it is more preferable that all of $a_{11}$ to $a_{14}$ are 1. M represents a hydrogen atom, a metal element or an oxide, hydroxide or halide thereof, and is preferably Cu, Ni, Zn or Al, and most preferably Cu.

When the phthalocyanine dye represented by Formula (C-I) or (C-II) is water-soluble, it preferably has an ionic hydrophilic group. Examples of the ionic hydrophilic group include a sulfo group, a carboxyl group, a phosphono group and a quaternary ammonium group. Preferable examples of the ionic hydrophilic group include a carboxyl group, a phosphono group and a sulfo group, and particularly preferable examples thereof include a carboxyl group and a sulfo group. A carboxyl group, a phosphono group and a sulfo group may each be a salt, and examples of a counter ion that forms the salt include an ammonium ion, an alkali metal ion (such as a lithium ion, a sodium ion, or a potassium ion) and an organic cation (such as a tetramethyl ammonium ion, a tetramethyl guanidium ion, or a tetramethyl phosphonium ion). Among the counter ions, alkali metal salts are preferred, and a lithium salt is particularly preferred because the lithium salt increases the solubility of the dye whereby the ink stability is improved.

As to the number of the ionic hydrophilic groups, at least two ionic hydrophilic groups are preferably included in one molecule of the phthalocyanine dye, and it is particularly preferable that the phthalocyanine dye includes at least two of sulfo group and/or carboxyl group in a molecule thereof.

Regarding the preferred combinations of the substituents to be included in the compound represented by Formula (C-II), it is desirable that at least one substituent of the compound is one of the exemplary substituents mentioned above. More preferably, a larger number of substituents may respectively be one of the exemplary substituents, and most preferably, all of the substituents included in the compound are one of the exemplary substituents.

The phthalocyanine dye that is used in the invention preferably has a chemical structure in which at least one electron-attracting group such as a sulfinyl group, a sulfonyl group or a sulfamoyl group is introduced into all of the four benzene rings of the phthalocyanine skeleton so that the total σp value of all of these substituents in the phthalocyanine skeleton may be at least 1.6.

The phthalocyanine derivative represented by Formula (C-I) is generally in the form of a mixture of analogues thereof in which the position and the number of the substituents Xn (n=1 to 4) and Ym (m=1 to 4) inevitably differ depending on the method of producing the phthalocyanine dye. In most cases, therefore, the formula for the phthalocyanine derivative indicates the statistical average of the mixture of analogues of the derivative. Having grouped the mixtures of analogues into the three types mentioned below, certain specific types of the mixture are found to be especially preferred in the invention. Specifically, the mixture of phthalocyanine dye analogues of Formulae (C-I) and (C-II) is grouped into the following three types, depending on the position of the substituents in the analogues, and each type is defined as in the following.

(1) β-position substitution type: a phthalocyanine dye having at least one specified substituent at 2-position and/or 3-position, 6-position and/or 7-position, 10-position and/or 11-position, or 14-position and/or 15-position thereof;

(2) α-position substitution type: a phthalocyanine dye having at least one specified substituent at 1-position and/or 4-position, 5-position and/or 8-position, 9-position and/or 12-position, or 13-position and/or 16-position thereof; and (3) α,β-position mixed substitution: a phthalocyanine dye having at least one specified substituent randomly at 1 to 16-position thereof.

When phthalocyanine dye derivatives having different structures (particularly derivatives in which the position(s) of substitution is/are different) are described herein, they are referred to as any of the above-mentioned, β-substitution, α-substitution, or α,β-substitution type.

The phthalocyanine derivative used in the invention may be produced, for example, according to the methods described or referred to in, Phthalocyanines—Chemistry and Function, by Shirai & Kobayashi (pp. 1-62, IPC), and Phthalocyanines—Properties and Applications, by C. C. Lenznoff & A. B. P. Lever (pp. 1-54, VCH), or according to methods similar to those methods.

The phthalocyanine compound represented by Formula (C-I) used in the invention may be produced, for example, through sulfonation, sulfonylchloridation or amidation of unsubstituted phthalocyanine compounds, as disclosed in WO 00/17275, 00/08103, 00/08101, 98/41853, and JP-A 10-36471. In this case, sulfonation may occur at any position of the phthalocyanine nucleus, and the number of the positions for sulfonation is difficult to be controlled. Accordingly, in the case where the sulfo group is introduced under the reaction condition of the process, the position and the number of the sulfo groups introduced could not be identified, and the process inevitably gives a mixture of analogues that differ in the position and the number of the substituents. Therefore, in the case where the compound used in the invention is produced from the product produced according to the process, the number and the position of the heterocyclic substituted sulfamoyl groups introduced in the compound cannot be identified, and the compound thus produced for use in the invention shall be in the form of a mixture of some α,β-substituted types that differ in the number and the position of the substituents therein.

For example, when a large number of electron-attracting groups such as sulfamoyl groups are introduced into the phthalocyanine nucleus, the oxidation potential of the resultant dye is nobler and the ozone resistance thereof therefore increases, as mentioned hereinabove. However, according to the production process mentioned above, it is inevitable that the products contain phthalocyanine dyes which have fewer electron-attracting groups introduced therein and of which the oxidation potential is baser. Accordingly, for improving the ozone resistance of the dyes, it is desirable to employ a production process in which the production of the compounds having a baser oxidation potential is retarded.

On the other hand, the phthalocyanine compound represented by Formula (C-II) used in the invention may be derived from a tetrasulfophthalocyanine compound that is obtained, for example, through reaction of a phthalonitrile derivative (compound P) and/or a diiminoisoindoline derivative (compound Q) with a metal derivative represented by the following Formula (C-III), or through reaction of a 4-sulfophthalic acid derivative (compound R) with the metal derivative represented by Formula (C-III).

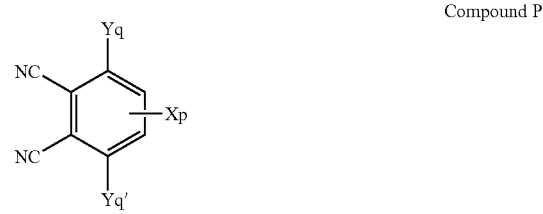

Compound P

Compound Q

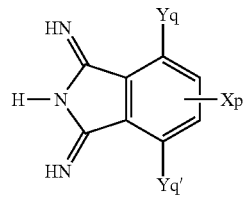

Compound R

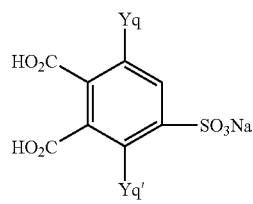

In the formulae, Xp independently corresponds to $X_{11}$, $X_{12}$, $X_{13}$ or $X_{14}$ in Formula (C-II), and Yq and Yq' each independently correspond to any of $Y_{11}$, $Y_{12}$, $Y_{13}$, $Y_{14}$, $Y_{15}$, $Y_{16}$, $Y_{17}$ or $Y_{18}$ in Formula (C-II).

$$M\text{-}(Y)_d \qquad \text{Formula (C-III)}$$

In Formula (C-III), M is the same as that in Formula (C-II); Y represents a monovalent or divalent ligand such as a halogen atom, an acetate anion, an acetylacetonate group or an oxygen atom; and d indicates an integer of from 1 to 4.

That is, according to the synthesis method, a specified number of a desired substituent may be introduced. When many electron-attracting groups are intended to be introduced to make an oxidation potential of a dye nobler, the synthesis method is extremely superior to the synthesis method of Formula (C-I).

The phthalocyanine compound represented by Formula (C-II) thus obtained is generally in the form of a mixture of compounds represented by the following Formulae (a)-1 to (a)-4 which are isomers in point of the substitution position of Xp therein, or that is, in the form of the β-substituted type mixture.

Formula (a)-1

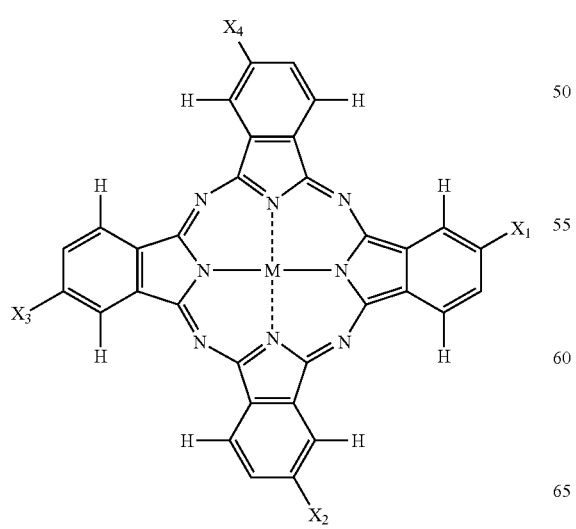

Formula (a)-2

Formula (a)-3

Formula (a)-4

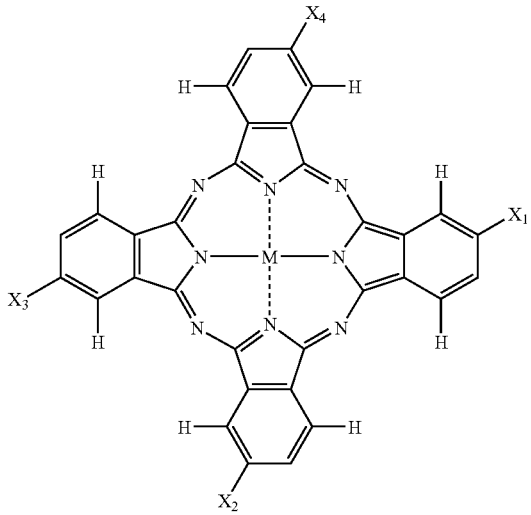

When all of Xp's in the starting compounds in the above-mentioned process are the same, then β-substituted type phthalocyanine dyes are obtained in which all of $X_{11}$, $X_{12}$, $X_{13}$ and $X_{14}$ represents the same substituents. On the other hand, when starting compounds that differ in point of Xp are combined and used in the process, dyes in which the substituents are of the same type but partially differ or dyes having different substituents can be obtained. Of the dyes represented by Formula (C-II), those having different electron-attracting groups are especially preferred because their solubility and associability, and the storage stability of ink containing the dye can be controlled.

The phthalocyanine dyes represented by Formulae (C-I) and (C-II) can be produced according to the above-mentioned patent publications, or they may also be produced according to the methods described in Japanese Patent Application Laid-Open (JP-A) Nos. 2002-302623, 2002-294097, 2002-249677 and 2003-012952. However, the starting materials, the intermediates and the production routes for the dyes are not limited to these.

An example of azo dyes preferably used as a magenta or yellow dye in the invention is a compound represented by the following Formula (II).

$$\text{Het(A)-N=N-Het(B)} \qquad \text{Formula (II)}$$

In Formula (II), Het(A) and Het(B) each represent a 5- or 6-membered unsaturated heterocycle. Examples of the unsaturated heterocycle represented by Het(A) or Het(B) include a thiophene ring, a furan ring, a pyrrole ring, a thiazole ring, an oxazole ring, an imidazole ring, an isothiazole ring, an isoxazole ring, a pyrazole ring, a thiadiazole ring, an oxadiazole ring, a triazole ring, a pyridine ring, a pyridazine ring, a pyrimidine ring and a pyrazine ring. The unsaturated heterocycles may further have a substituent. The substituents held on the unsaturated heterocycles may bond to each other to form a condensed ring with a hydrocarbon ring or an unsaturated heterocycle, and the condensed ring may further have an additional substituent. In the case of a nitrogen-containing unsaturated heterocycle, a nitrogen atom may be quaternarized. Regarding an unsaturated heterocycle that may be a tautomer, even when only one form of the tautomer is described in the specification, another form of the tautomer as well is included.

When the dye is a water-soluble dye, it is preferable that the dye further has an ionic hydrophilic group as a substituent. Examples of the ionic hydrophilic group as the substituent include a sulfo group, a carboxyl group, a phosphono group and a quaternary ammonium group.

Examples of the heterocycle represented by Het(A) or Het(B) preferably include a thiazole ring, an isothiazole ring, a pyrazole ring, a thiadiazole ring, a pyridine ring and a pyrazine ring. More preferably, the heterocycle is any of an isothiazole ring, a pyrazole ring, a thiadiazole ring and a pyridine ring, and most preferably, the heterocycle is any of a pyrazole ring, a 1,2,4-thiadiazole ring and a pyridine ring.

Het(A) and Het(B) may each have a substituent. Examples of the substituent include a halogen atom, an alkyl group (including a cycloalkyl group), an alkenyl group (including a cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic-thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an aryl azo group, a heterocyclic-azo group, an imido group, a phosphino group, a phosphono group, a phosphinyl group, a phosphinyloxy group, a phosphinylamino group, and a silyl group. Of these, preferred are substituents such as a halogen atom, a heterocyclic group, a cyano group, a nitro group, a carboxyl group, an acyloxy group, a carbamoyloxy group, an alkoxycarbonyloxy group, an aryloxycarbonyloxy group, a sulfamoyl group, a sulfo group, an alkylsulfinyl group, an arylsulfinyl group, an alkylsulfinyl group, an arylsulfinyl group, an acyl group, an aryloxycarbonyl group, an alkoxycarbonyl group, a carbamoyl group, an imido group, a phosphoryl group, a phosphono group, a phosphinyl group, a phosphonyl group, a phosphinyloxy group, and a phosphinylamino group. In particular, especially preferred are electron-attracting groups, and more preferred are those having σp of at least 0.40. Examples of the substituents having σp of at least 0.40 are a cyano group, a nitro group, a carboxyl group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphono group, a phosphoryl group, as well as an alkyl group substituted by an electron-attracting group (e.g., a trihalomethyl group, a perfluoroalkyl group, a dicyanomethyl group, an iminomethyl group), an alkenyl group substituted by an electron-attracting group (e.g., a tricyanovinyl group), and a quaternary salt substituent (e.g., a sulfonium group, an ammonium group, a phosphonium group). Of the functional groups, those having a hydrogen atom may be further substituted by removing the hydrogen atom and substituting the hydrogen with any of the above-mentioned groups. Examples of the substituents are an alkylcarbonylaminosulfonyl group, an arylcarbonylaminosulfonyl group, an alkylsulfonylaminocarbonyl group, and an arylsulfonylaminocarbonyl group.

The substituents on the heterocycle may bond to each other to form a condensed ring with the heteroatom, and the condensed ring may further have an additional substituent.

A preferred example of the magenta dye for use herein is a compound represented by the following Formula (M-I).

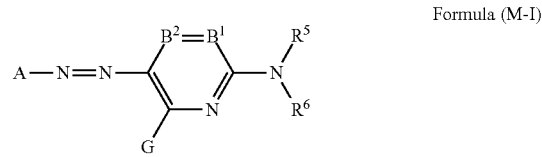

Formula (M-I)

In Formula (M-I), A represents a residue of a 5-membered heterocyclic diazo component A-NH$_2$; B$^1$ and B$^2$ represent —CR$^1$= and —CR$^2$=, respectively, or any one of B$^1$ and B$^2$ represents a nitrogen atom and the other represents —CR$^1$= or —CR$^2$=; R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl or arylsulfonyl group, or a sulfamoyl group, which may have an additional substituent.

G, R$^1$ and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including a heterocyclic amino group and an anilino group), an acylamino group, an ureido group, a sulfamoylamino group, an alkoxycarbonylamino group, an aryloxycarbonylamino group, an alkylsulfonylamino or arylsulfonylamino group, a heterocyclic sulfonylamino group, a nitro group, an alkylthio or arylthio group, an alkylsulfonyl or arylsulfonyl group, a heterocyclic sulfonyl group, an alkylsulfinyl or arylsulfinyl group, a heterocyclic sulfinyl group, a sulfamoyl group, a sulfo group or a heterocyclic-thio group, which may have an additional substituent. $R^1$ and $R^5$, or $R^5$ and $R^6$ may bond to each other to form a 5- or 6-membered ring.

In Formula (M-I), A represents a residue of a 5-membered heterocyclic diazo component A-NH$_2$. Examples of the heteroatom of the heterocycle include N, O and S. Preferably, the heterocycle is a nitrogen-containing 5-membered heterocycle. The heterocycle may be condensed with an aliphatic ring, an aromatic ring or any other heterocycle. Preferred examples of the heterocycle for A are a pyrazole ring, an imidazole ring, a thiazole ring, an isothiazole ring, a thiadiazole ring, a benzothiazole ring, a benzoxazole ring and a benzisothiazole ring. These heterocycles may further have an additional substituent. In particular, a pyrazole ring, an imidazole ring, an isothiazole ring, a thiadiazole and a benzothiazole ring represented by the following Formulae (a) to (f), respectively, are preferred.

Formulae (a)

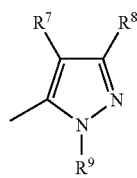

(b)

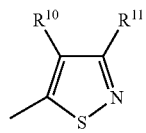

(c)

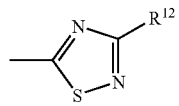

(d)

(e)

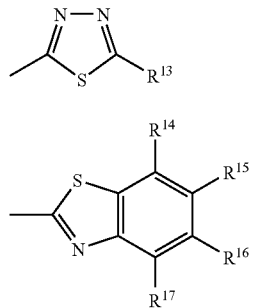

(f)

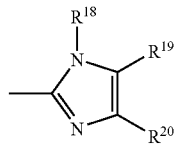

In Formulae (a) to (f), $R^7$ to $R^{20}$ each independently represent the same substituent as those described for G, $R^1$ and $R^2$. Of Formulae (a) to (f), preferred are a pyrazole ring and an isothiazole ring represented by Formulae (a) and (b), respectively, and most preferred is a pyrazole ring represented by Formula (a).

In Formula (M-I), $B^1$ and $B^2$ represent —CR$^1$= and —CR$^2$=, respectively, or any one of $B^1$ and $B^2$ represents a nitrogen atom and the other represents —CR$^1$= or —CR$^2$=. Preferably, $B^1$ and $B^2$ represent —CR$^1$= and —CR$^2$=, respectively.

$R^5$ and $R^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl or arylsulfonyl group, or a sulfamoyl group, which may have an additional substituent. Preferably, $R^5$ and $R^6$ each independently represent a hydrogen atom, an aliphatic group, an aromatic group, a heterocyclic group, an acyl group, or an alkylsulfonyl or arylsulfonyl group. More preferably, $R^5$ and $R^6$ each independently represent a hydrogen atom, an aromatic group, a heterocyclic group, an acyl group, or an alkylsulfonyl or arylsulfonyl group. Most preferably, $R^5$ and $R^6$ each independently represent a hydrogen atom, an aryl group or a heterocyclic group. The groups may further have a substituent. However, $R^5$ and $R^6$ do not represent hydrogen atoms at the same time.

G, $R^1$ and $R^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkylsulfonylamino or arylsulfonylamino group, a heterocyclic sulfonylamino group, a nitro group, an alkylthio or arylthio group, a heterocyclic-thio group, an alkylsulfonyl or arylsulfonyl group, a heterocyclic sulfonyl group, an alkylsulfinyl or arylsulfinyl group, a heterocyclic sulfinyl group, a sulfamoyl group or a sulfo group, which may have an additional substituent.

Examples of the substituent represented by G preferably include a hydrogen atom, a halogen atom, an aliphatic group, an aromatic group, a hydroxyl group, an alkoxy group, an aryloxy group, an acyloxy group, a heterocyclic-oxy group, an amino group (including an anilino group and a heterocyclic amino group), an acylamino group, a ureido group, a sulfamoylamino group, an alkoxycarbonylamino group, an aryloxycarbonylamino group, an alkylthio or arylthio group, and a heterocyclic-thio group. More preferable examples thereof include a hydrogen atom, a halogen atom, an alkylthio group, a hydroxyl group, an alkoxy group, an aryloxy group, an acyloxy group, an amino group (including an anilino group and a heterocyclic amino group) and an acylamino group, and most preferably include a hydrogen atom, an anilino group and an acylamino group. Each of the groups may further have a substituent.

Examples of preferable substituents represented by $R^1$ or $R^2$ include a hydrogen atom, an alkyl group, a halogen atom, an alkoxycarbonyl group, a carboxyl group, a carbamoyl group, a hydroxyl group, an alkoxy group and a cyano group. The groups each may further have a substituent. $R^1$ and $R^5$, or $R^5$ and $R^6$ may bond to each other to form a 5- or 6-membered ring.

When any of the groups of A, $R^1$, $R^2$, $R^5$, $R^6$ and G have a further substituent, the substituent may be selected from the substituents for G, $R^1$ and $R^2$.

When the dye of the invention is water-soluble, it is desirable that any of A, $R^1$, $R^2$, $R^5$, $R^6$ and G further has an additional substituent of an ionic hydrophilic group. Examples of the ionic hydrophilic group as the additional substituent include a sulfo group, a carboxyl group, a phosphono group and a quaternary ammonium group. The ionic hydrophilic group is preferably a carboxyl group, a phosphono group or a sulfo group, and more preferably a carboxyl group or a sulfo group. The carboxyl, phosphono and sulfo groups may each be in the form of salt. Examples of the counter ion that forms the salt include an ammonium ion, an alkali metal ion (e.g., a lithium ion, a sodium ion or a potassium ion), and an organic cation (e.g., a tetramethylammonium ion, a tetramethylguanidium ion or a tetramethylphosphonium ion).

The "aliphatic group" as used herein is intended include an alkyl group, a substituted alkyl group, an alkenyl group, a substituted alkenyl group, an alkynyl group, a substituted alkynyl group, an aralkyl group and a substituted aralkyl group. The aliphatic group may be branched or may be cyclic. Preferably, the aliphatic group has from 1 to 20 carbon atoms, and more preferably from 1 to 16 carbon atoms. The aryl moiety of the aralkyl group or the substituted aralkyl group is preferably a phenyl or naphthyl group, and more preferably a phenyl group. Specific examples of the aliphatic group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The "aromatic group" as used herein is intended to include an aryl group and a substituted aryl group. The aryl group is preferably a phenyl or naphthyl group, and more preferably a phenyl group. The aromatic group preferably has from 6 to 20 carbon atoms, and more preferably from 6 to 16 carbon atoms. Specific examples of the aromatic group include a phenyl group, group p-tolyl group, a p-methoxyphenyl group, an o-chlorophenyl group and a m-(3-sulfopropylamino)phenyl group.

The "heterocyclic group" is intended to include a substituted heterocyclic group and an unsubstituted heterocyclic group. The heterocycle may be condensed with an aliphatic ring, an aromatic ring or any other heterocycle. The heterocyclic group is preferably a 5- or 6-membered heterocyclic group. Examples of the substituent of the substituted heterocyclic group include an aliphatic group, a halogen atom, an alkyl sulfonyl and arylsulfonyl group, an acyl group, an acylamino group, a sulfamoyl group, a carbamoyl group, and an ionic hydrophilic group. Specific examples of the heterocyclic group include a 2-pyridyl group, a 2-thienyl group, a 2-thiazolyl group, a 2-benzothiazolyl group, a 2-benzoxazolyl group and a 2-furyl group.

The "alkylsulfonyl or arylsulfonyl group" is intended to include a substituted alkylsulfonyl or arylsulfonyl group, and an unsubstituted alkylsulfonyl or arylsulfonyl group. Examples of the alkylsulfonyl or arylsulfonyl group include a methylsulfonyl group and a phenylsulfonyl group.

The "alkylsulfinyl or arylsulfinyl group" is intended to include a substituted alkylsulfinyl or arylsulfinyl group, and an unsubstituted alkylsulfinyl or arylsulfinyl group. Examples of the alkylsulfinyl or arylsulfinyl group include a methylsulfinyl group and a phenylsulfinyl group.

The "acyl group" is intended to include a substituted acyl group and an unsubstituted acyl group. The acyl group preferably has from 1 to 20 carbon atoms. An example of the substituent of the substituted acyl group is an ionic hydrophilic group. Examples of the acyl group include an acetyl group and a benzoyl group.

Examples of the halogen atom include a fluorine atom, a chlorine atom and a bromine atom.

Examples of the amino group include an amino group substituted by an alkyl group, an aryl group or a heterocyclic group (i.e., the amino group may be an alkylamino group, an arylamino group or a heterocyclic amino group). The alkyl, aryl and heterocyclic groups may each further have a substituent. The alkylamino group preferably has from 1 to 20 carbon atoms. An example of the substituent of the alkyl, aryl or heterocyclic group is an ionic hydrophilic group. Examples of the alkylamino group include a methylamino group and a diethylamino group.

The arylamino group is intended to include a substituted arylamino group and an unsubstituted arylamino group. The arylamino group preferably has from 6 to 20 carbon atoms. Examples of the substituent of the substituted arylamino group include a halogen atom and an ionic hydrophilic group. Examples of the arylamino group include a phenylamino group and a 2-chlorophenylamino group.

The heterocyclic amino group is intended to include a substituted heterocyclic amino group and an unsubstituted heterocyclic amino group. The heterocyclic amino group preferably has from 2 to 20 carbon atoms. Examples of the substituent of the substituted group included an alkyl group, a halogen atom and an ionic hydrophilic group.

The alkoxy group is intended to include a substituted alkoxy group and an unsubstituted alkoxy group. The alkoxy group preferably has from 1 to 20 carbon atoms. Examples of the substituent of the substituted alkoxy group include an alkoxy group, a hydroxyl group, and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group is intended to include a substituted aryloxy group and an unsubstituted aryloxy group. The aryloxy group preferably has from 6 to 20 carbon atoms. Examples of the substituent for the substituted aryloxy group include an alkoxy group and an ionic hydrophilic group. Examples of the aryloxy group include a phenoxy group, a p-methoxyphenoxy group and an o-methoxyphenoxy group.

The silyloxy group is preferably substituted by at least one of an aliphatic group having from 1 to 20 carbon atoms and an aromatic group having from 1 to 20 carbon atoms. Examples of the silyloxy group include a trimethylsilyloxy group and a diphenylmethylsilyloxy group.

The heterocyclic-oxy group is intended to include a substituted heterocyclic-oxy group and an unsubstituted heterocyclic-oxy group. The heterocyclic-oxy group preferably has from 2 to 20 carbon atoms. Examples of the substituent of the substituted heterocyclic-oxy group include an alkyl group, an alkoxy group, and an ionic hydrophilic group. Examples of the heterocyclic-oxy group include a 3-pyridyloxy group and a 3-thienyloxy group.

The alkoxycarbonyloxy group is intended to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group include a methoxycarbonyloxy group and an isopropoxycarbonyloxy group.

The aryloxycarbonyloxy group is intended to include a substituted aryloxycarbonyloxy group and an unsubstituted aryloxycarbonyloxy group. The aryloxycarbonyloxy group preferably has from 7 to 20 carbon atoms. An example of the aryloxycarbonyloxy group is a phenoxycarbonyloxy group.

The acylamino group is intended to include a substituted acylamino group and an unsubstituted acylamino group. The acylamino group preferably has from 2 to 20 carbon atoms. An example of the substituent of the substituted acylamino group is an ionic hydrophilic group. Examples of the acylamino group include an acetylamino group, a propionylamino group, a benzoylamino group, an N-phenylacetylamino group and a 3,5-disulfobenzoylamino group.

The ureido group is intended to include a substituted ureido group and an unsubstituted ureido group. The ureido group preferably has from 1 to 20 carbon atoms. Examples of the substituent of the substituted ureido group include an alkyl group and an aryl group. Examples of the ureido group include a 3-methylureido group, a 3,3-dimethylureido group and a 3-phenylureido group.

The sulfamoylamino group is intended to include a substituted sulfamoylamino group and an unsubstituted sulfamoylamino group. An example of the substituent of the substituted sulfamoylamino group is an alkyl group. An example of the sulfamoylamino group is an N,N-dipropylsulfamoylamino group.

The alkoxycarbonylamino group is intended to include a substituted alkoxycarbonylamino group and an unsubstituted alkoxycarbonylamino group. The alkoxycarbonylamino group preferably has from 2 to 20 carbon atoms. An example of the substituent of the substituted alkoxycarbonylamino group is an ionic hydrophilic group. An example of the alkoxycarbonylamino group is an ethoxycarbonylamino group.

The alkylsulfonylamino or arylsulfonylamino group is intended to include a substituted alkylsulfonylamino or arylsulfonylamino group and an unsubstituted alkylsulfonylamino or arylsulfonylamino group. The sulfonylamino group preferably has from 1 to 20 carbon atoms. An example of the substituent of the substituted alkylsulfonylamino or arylsulfony group is an ionic hydrophilic group. Examples of the sulfonylamino group include a methylsulfonylamino group, an N-phenyl-methylsulfonylamino group, a phenylsulfonylamino group and a 3-carboxyphenylsulfonylamino group.

The carbamoyl group is intended to include a substituted carbamoyl group and an unsubstituted carbamoyl group. An example of the substituent of the substituted carbamoyl group is an alkyl group. Examples of the carbamoyl group include a methylcarbamoyl group and a dimethylcarbamoyl group.

The sulfamoyl group means to include a substituted sulfamoyl group and an unsubstituted sulfamoyl group. An example of the substituent of the substituted sulfamoyl group is an alkyl group. Examples of the sulfamoyl group include a dimethylsulfamoyl group and a di(2-hydroxyethyl)sulfamoyl group.

The alkoxycarbonyl group means to include a substituted alkoxycarbonyl group and an unsubstituted alkoxycarbonyl group. The alkoxycarbonyl group preferably has from 2 to 20 carbon atoms. An example of the substituent of the substituted alkoxycarbonyl group is an ionic hydrophilic group. Examples of the alkoxycarbonyl group include a methoxycarbonyl group and an ethoxycarbonyl group.

The acyloxy group means to include a substituted acyloxy group and an unsubstituted acyloxy group. The acyloxy group preferably has from 1 to 20 carbon atoms. An example of the substituent of the substituted acyloxy group is an ionic hydrophilic group. Examples of the acyloxy group include an acetoxy group and a benzoyloxy group.

The carbamoyloxy group means to include a substituted carbamoyloxy group and an unsubstituted carbamoyloxy group. An example of the substituent of the substituted carbamoyloxy group is an alkyl group. An example of the carbamoyloxy group is an N-methylcarbamoyloxy group.

The aryloxycarbonyl group means to include a substituted aryloxycarbonyl group and an unsubstituted aryloxycarbonyl group. The aryloxycarbonyl group preferably has from 7 to 20 carbon atoms. An example of the substituent of the substituted aryloxycarbonyl group is an ionic hydrophilic group. An example of the aryloxycarbonyl group is a phenoxycarbonyl group.

The aryloxycarbonylamino group means to include a substituted aryloxycarbonylamino group and an unsubstituted aryloxycarbonylamino group. The aryloxycarbonylamino group preferably has from 7 to 20 carbon atoms. An example of the substituent of the substituted aryloxycarbonylamino group is an ionic hydrophilic group. An example of the aryloxycarbonylamino group is a phenoxycarbonylamino group.

The alkylthio, arylthio or heterocyclic-thio group means to include a substituted alkylthio, arylthio or heterocyclic-thio group and an unsubstituted alkylthio, arylthio or heterocyclic-thio group. The alkylthio, arylthio or heterocyclic-thio group preferably has from 1 to 20 carbon atoms. An example of the substituent of the substituted alkylthio, arylthio or heterocyclic-thio group is an ionic hydrophilic group. Examples of the alkylthio, arylthio or heterocyclic-thio group include a methylthio group, a phenylthio group and a 2-pyridylthio group.

The heterocyclic-oxycarbonyl group means to include a substituted heterocyclic-oxycarbonyl group and an unsubstituted heterocyclic-oxycarbonyl group. The heterocyclic-oxycarbonyl group preferably has from 2 to 20 carbon atoms. An example of the substituent of the substituted heterocyclic-oxycarbonyl group is an ionic hydrophilic group. An example of the heterocyclic-oxycarbonyl group is a 2-pyridyloxycarbonyl group.

The heterocyclic sulfonylamino group means to include a substituted heterocyclic sulfonylamino group and an unsubstituted heterocyclic sulfonylamino group. The heterocyclic sulfonylamino group preferably has from 1 to 12 carbon atoms. An example of the substituent of the substituted heterocyclic sulfonylamino group is an ionic hydrophilic group. Examples of the heterocyclic sulfonylamino group include a 2-thiophene sulfonylamino group and a 3-pyridine sulfonylamino group.

The heterocyclic sulfonyl group means to include a substituted heterocyclic sulfonyl group and an unsubstituted heterocyclic sulfonyl group. The heterocyclic sulfonyl group preferably has from 1 to 20 carbon atoms. An example of the substituent of the substituted heterocyclic sulfonyl group is an ionic hydrophilic group. Examples of the heterocyclic sulfonyl group include a 2-thiophene sulfonyl group and a 3-pyridine sulfonyl group.

The heterocyclic sulfinyl group means to include a substituted heterocyclic sulfinyl group and an unsubstituted heterocyclic sulfinyl group. The heterocyclic sulfinyl group preferably has from 1 to 20 carbon atoms. An example of the substituent of the substituted heterocyclic sulfinyl group is an ionic hydrophilic group. An example of the heterocyclic sulfinyl group is a 4-pyridine sulfinyl group.

The dye represented by Formula (M-I) used in the invention is preferably a dye represented by the following Formula (M-II).

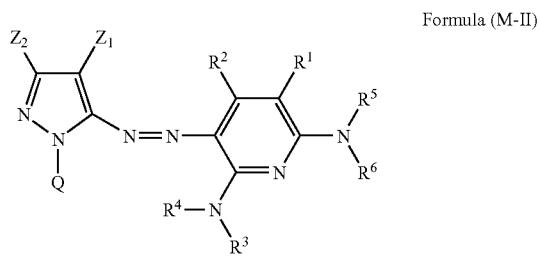

Formula (M-II)

In Formula (M-II), $Z_1$ represents an electron-attracting group having a Hammett's substituent constant σp of at least 0.20. $Z_1$ is preferably an electron-attracting group having σp of at least 0.30, more preferably at least 0.45, and further preferably at least 0.60, but not exceeding 1.0. Preferred examples of the electron-attracting group for $Z_1$ are mentioned below. In particular, $Z_1$ preferably represents an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms, more preferably a cyano group, an alkylsulfonyl group having from 1 to 20 carbon atoms, or an arylsulfonyl group having from 6 to 20 carbon atoms, and most preferably a cyano group.

$R^1$, $R^2$, $R^5$ and $R^6$ have the same definition as those in Formula (M-1). $R^3$ and $R^4$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl or arylsulfonyl group, or a sulfamoyl group. Among these, a hydrogen atom, an aromatic group, a heterocyclic group, an acyl group and an alkylsulfonyl or arylsulfonyl group are preferred, and a hydrogen atom, an aromatic group and a heterocyclic group are particularly preferred. $Z_2$ represents a hydrogen atom, an aliphatic group, an aromatic group or a heterocyclic group. Q represents a hydrogen atom, an aliphatic group, an aromatic group or a heterocyclic group. In particular, Q preferably represents a group made of nonmetallic atomic group necessary for forming a 5- to 8-membered ring. The 5- to 8-membered ring may be substituted, and may be a saturated ring or may have an unsaturated bond. Among these, an aromatic group and a heterocyclic group are preferred. Examples of preferable non-metallic atom include a nitrogen atom, an oxygen atom, a sulfur atom and a carbon atom. Specific examples of such a ring structure include a benzene ring, a cyclopentane ring, a cyclohexane ring, a cycloheptane ring, a cyclooctane ring, a cyclohexane ring, a pyridine ring, a pyrimidine ring, a pyrazine ring, a pyridazine ring, a triazine ring, an imidazole ring, a benzoimidazole ring, an oxazole ring, a benzooxazole ring, a thiazole ring, a benzothiazole ring, an oxane ring, a sulfolane ring and a thiane ring.

The groups in Formula (M-II) may further have an additional substituent. When the groups in Formula (M-II) further have an additional substituent, the additional substituent may be the substituents described for the groups in Formula (M-I), the groups mentioned for G, $R^1$ and $R^2$, and an ionic hydrophilic group.

Examples of the electron-attracting group having a Hammett's substituent constant σp of at least 0.60 include a cyano group, a nitro group, an alkylsulfonyl group (e.g., a methanesulfonyl group), and an arylsulfonyl group (e.g., a benzenesulfonyl group).

Examples of the electron-attracting group having a Hammett's substituent constant σp of at least 0.45 include, in addition to the groups mentioned above, an acyl group (e.g., acetyl group), an alkoxycarbonyl group (e.g., dodecyloxycarbonyl group), an aryloxycarbonyl group (e.g., m-chlorophenoxycarbonyl group), an alkylsulfinyl group (e.g., n-propylsulfinyl group), an arylsulfinyl group (e.g., phenylsulfinyl group), a sulfamoyl group (e.g., N-ethylsulfamoyl group, N,N-dimethylsulfamoyl group), and a halogenoalkyl group (e.g., trifluoromethyl group).

Examples of the electron-attracting group having a Hammett's substituent constant σp of at least 0.30 include, in addition to the groups mentioned above, an acyloxy group (e.g., acetoxy group), a carbamoyl group (e.g., N-ethylcarbamoyl group, N,N-dibutylcarbamoyl group), a halogenoalkoxy group (e.g., trifluoromethyloxy group), a halogenoaryloxy group (e.g., pentafluorophenyloxy group), a sulfonyloxy group (e.g., methylsulfonyloxy group), a halogenoalkylthio group (e.g., difluoromethylthio group), an aryl group substituted by at least two electron-attracting groups each having σp of at least 0.15 (e.g., 2,4-dinitrophenyl group, pentachlorophenyl group), and a heterocyclic group (e.g., 2-benzoxazolyl group, 2-benzothiazolyl group, 1-phenyl-2-benzimidazolyl group). Examples of the electron-attracting group having σp of at least 0.20 include, in addition to the groups mentioned above, a halogen atom.

Particularly preferred combinations of the substituents of the azo dyes represented by Formula (M-I) are described below. $R^5$ and $R^6$ each preferably represent a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ do not represent hydrogen atoms at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ represent —CR$^1$= and —CR$^2$=, respectively; and $R^1$ and $R^2$ each preferably represent a hydrogen atom, an alkyl group, a halogen atom, a cyano group, a carbamoyl group, a carboxyl group, a hydroxyl group, an alkoxy group or an alkoxycarbonyl group, and more preferably a hydrogen atom, an alkyl group, a carboxyl group, a cyano group or a carbamoyl group.

Preferred examples of the dye used in the invention are shown below, but they are intended to describe in detail the invention and are not intended to restrict the scope of the invention. The numeral in a parenthesis shown nest to each dye is the oxidation potential of the dye.

First, specific examples [Y-1 to Y-35] of the yellow dye used in the invention are shown below.
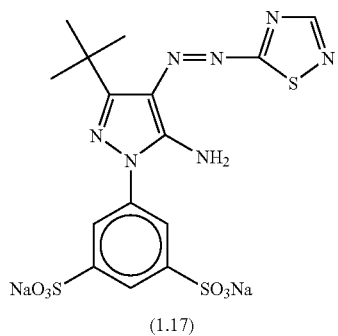
(1.17)
Y-1
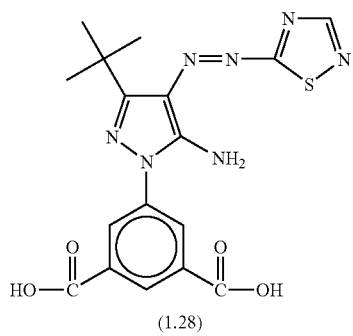
(1.28)
Y-2
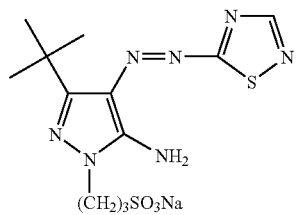
(1.20)
Y-3
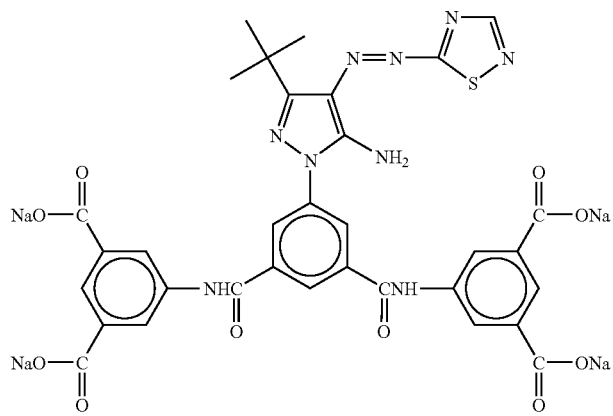
(1.27)
Y-4

-continued
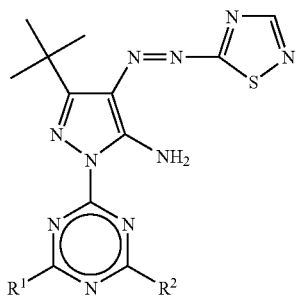
| Compound No. | R¹ | R² | Oxidation Potential (V) |
|---|---|---|---|
| Y-5 | ![3,5-di(COOK)-phenylamino] | ![3,5-di(COOK)-phenylamino] | 1.37 |
| Y-6 | —NH(CH$_2$)$_2$SO$_3$Li | —NH(CH$_2$)$_2$SO$_3$Li | 1.34 |
| Y-7 | ![2,4-di(SO3K)-phenylamino] | ![2,4-di(SO3K)-phenylamino] | 1.35 |
| Y-8 | ![4-SO3Na-phenylamino] | ![3,5-di(CONa)-phenylamino] | 1.36 |
| Y-9 | —NH(CH$_2$)$_2$SO$_3$Li | ![3,5-di(COOLi)-phenylamino] | 1.35 |
| Y-10 | ![pyrazole-thiadiazole substituent with N-methyl] | ![2,4-di(SO3K)-phenylamino] | 1.39 |

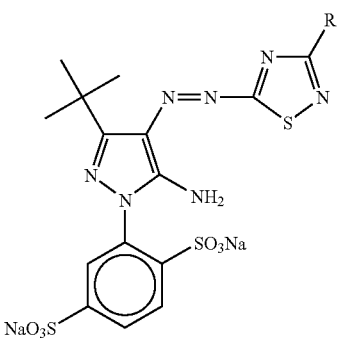
| Y-11 | R = —S(CH₂)₂SO₃Na | (1.20) |
| Y-12 | R = —Me | (1.19) |
| Y-13 | R = —H | (1.20) |
| Y-14 | R = —Ph | (1.18) |
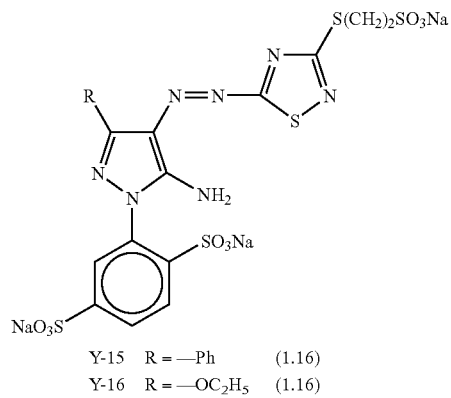
| Y-15 | R = —Ph | (1.16) |
| Y-16 | R = —OC₂H₅ | (1.16) |
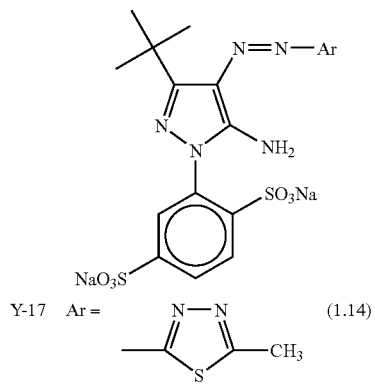
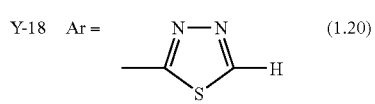
Y-17  Ar =    (1.14)
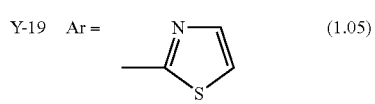
Y-18  Ar =    (1.20)
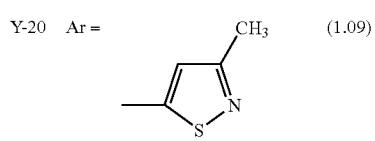
Y-19  Ar =    (1.05)
Y-20  Ar =    (1.09)

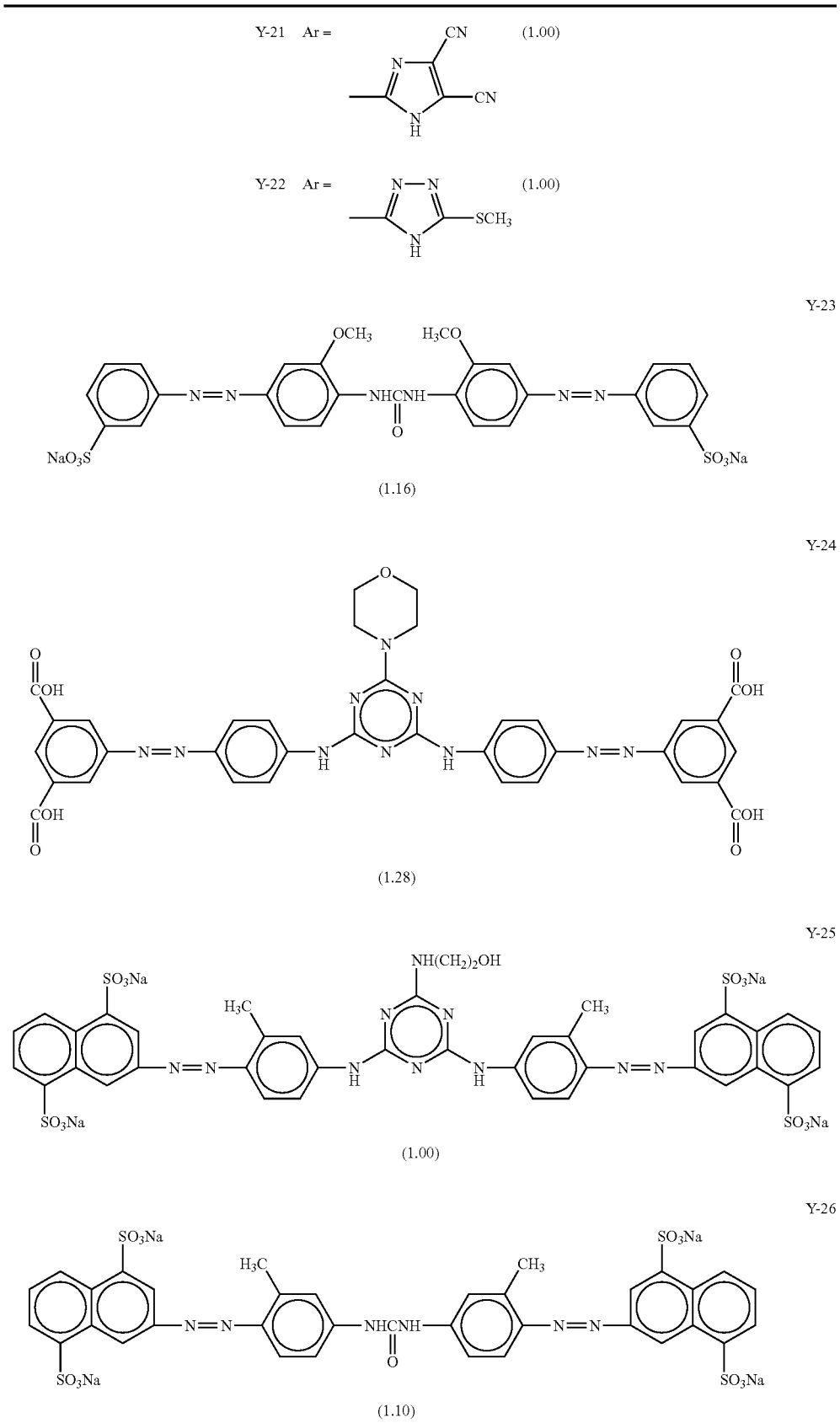

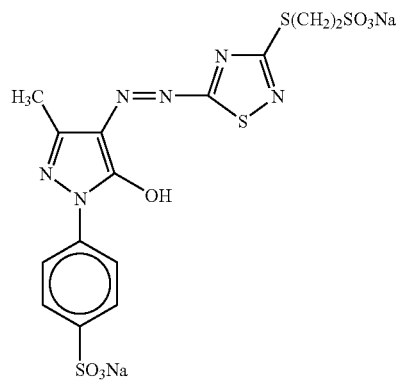
Y-27
(1.01)
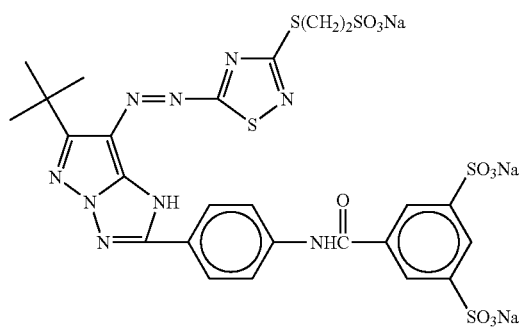
Y-28
(1.32)
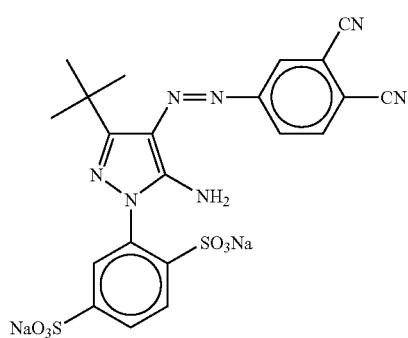
Y-29
(1.01)
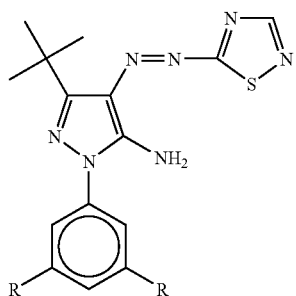
Y-30  R = —CON(C₄H₉)₂  (1.20)
Y-31  R = —CO₂C₈H₁₇  (1.21)

-continued
Y-32
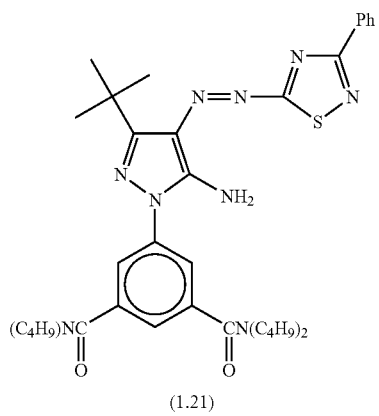
(1.21)
Y-33
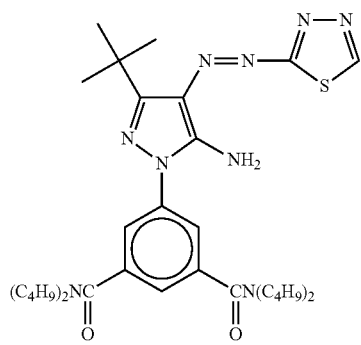
(1.19)
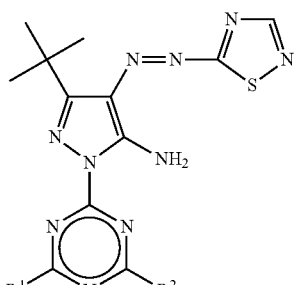
Y-34  R¹, R² = —NHCH₂CH(C₄H₉)(C₄H₉)   (1.37)
Y-35  R¹, R² = 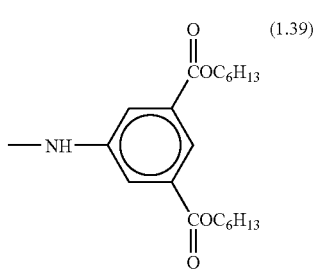   (1.39)

Next, specific examples [M-1 to M-26] of the magenta dye used in the invention are shown below.
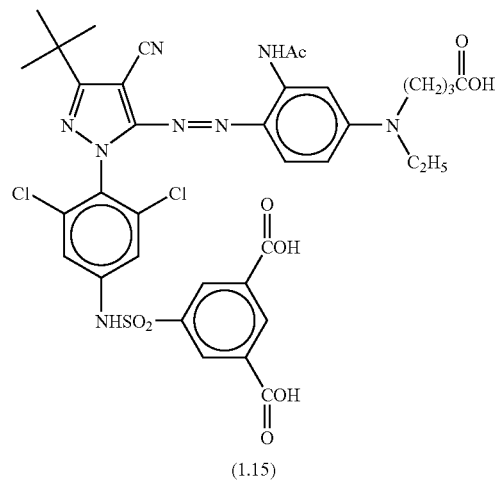
M-1
(1.15)
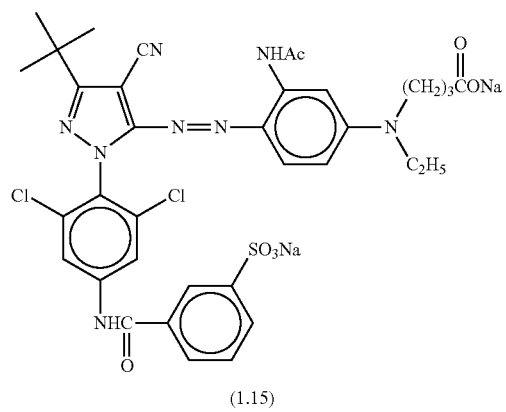
M-2
(1.15)
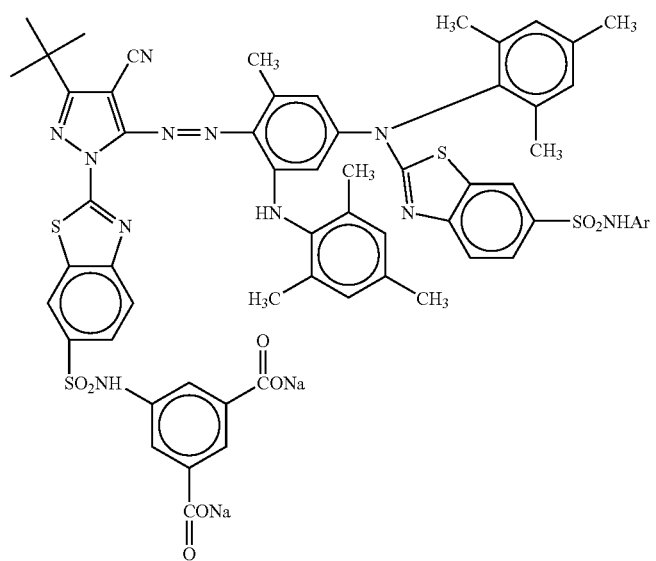

-continued
M-3 Ar = 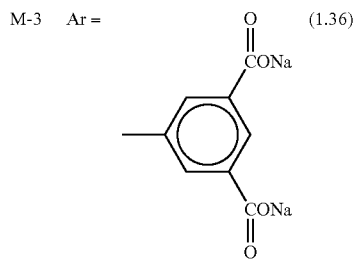 (1.36)
M-4 Ar = 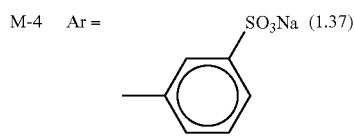 (1.37)
M-5 Ar = 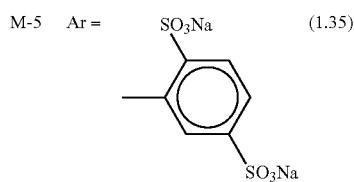 (1.35)
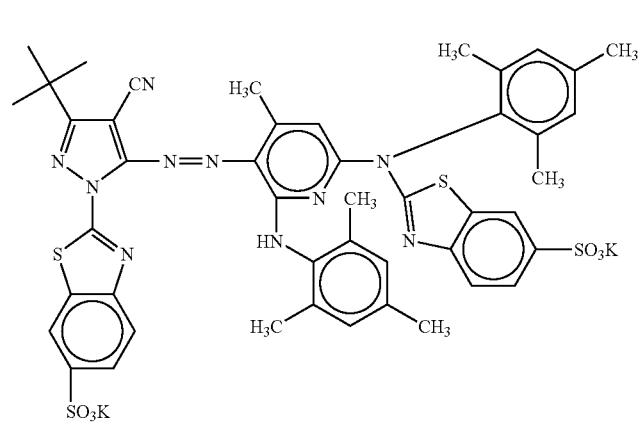
(1.37)
M-6
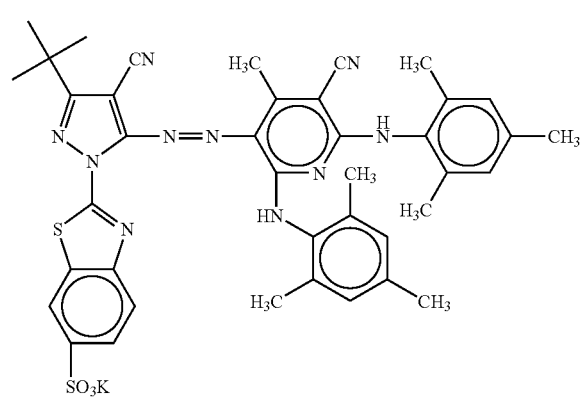
(1.32)
M-7

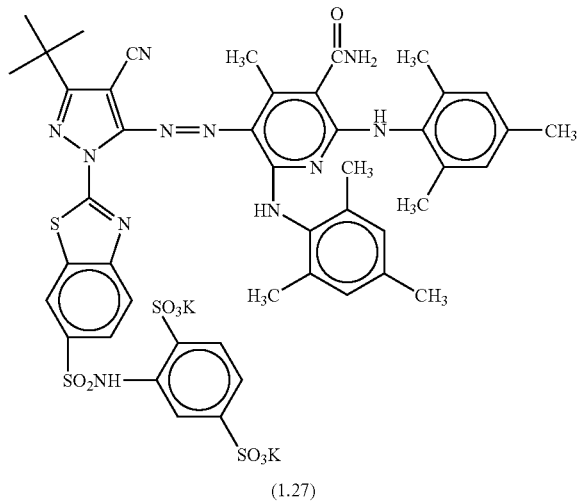
(1.27) M-8
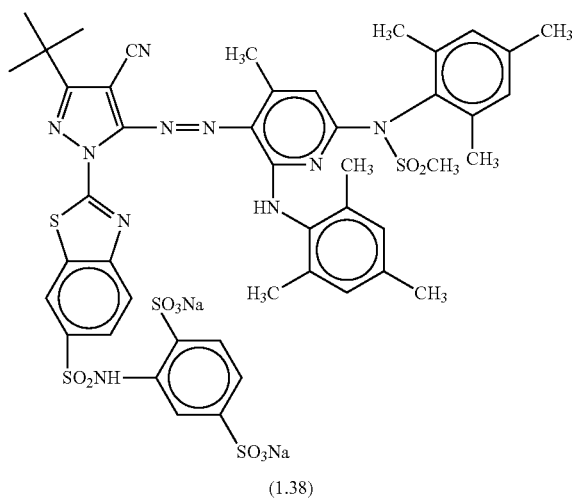
(1.38) M-9
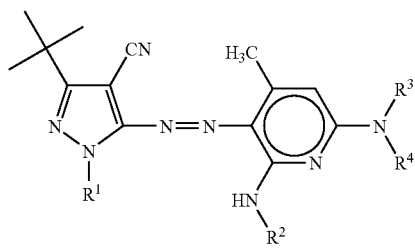
| Compound No. | R¹ | R² | R³ | R⁴ | Oxidation Potential (V) |
|---|---|---|---|---|---|
| M-10 | 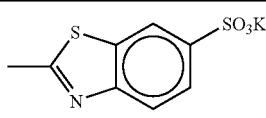 | 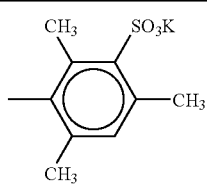 | 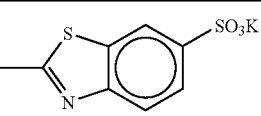 | 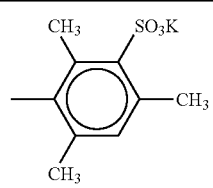 | 1.38 |

-continued
| | | | | | |
|---|---|---|---|---|---|
| M-11 | 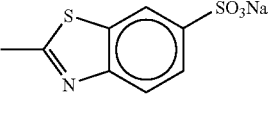 | 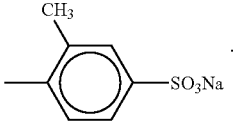 | 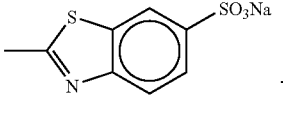 | 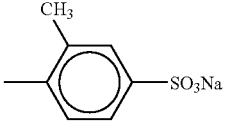 | 1.39 |
| M-12 | 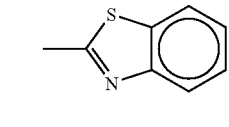 | 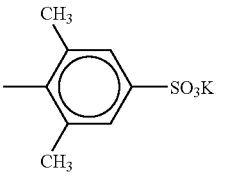 | 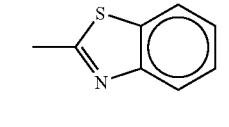 | 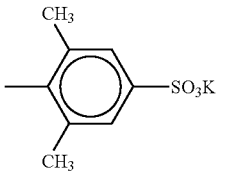 | 1.40 |
| M-13 | 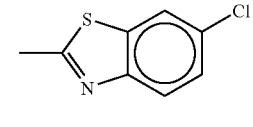 | 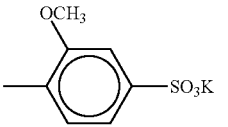 | 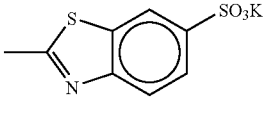 | 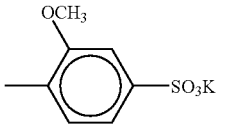 | 1.39 |
| M-14 | 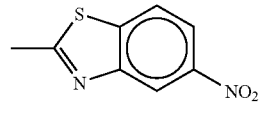 | 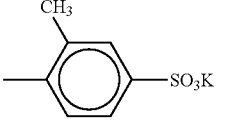 | 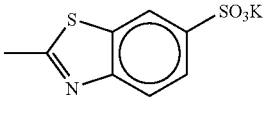 | 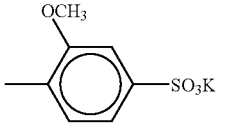 | 1.40 |
| M-15 | 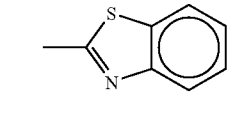 | 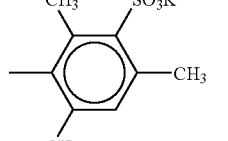 | 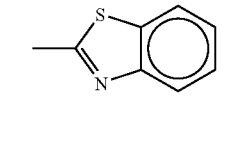 | 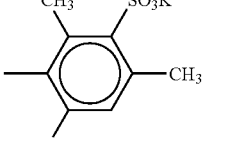 | 1.37 |
| M-16 | 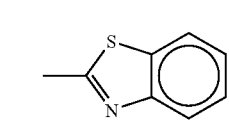 | 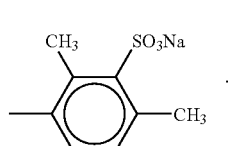 | 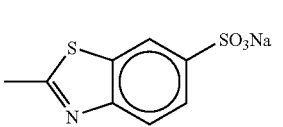 | 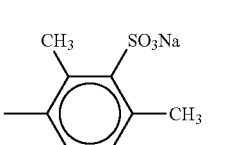 | 1.36 |
| M-17 | 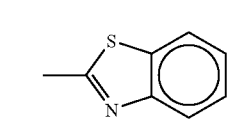 | 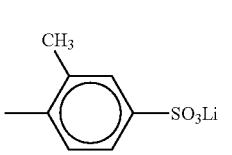 | 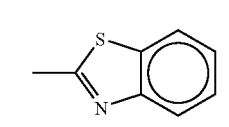 | 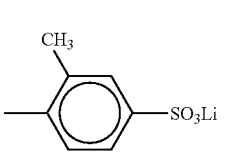 | 1.38 |
| M-18 | 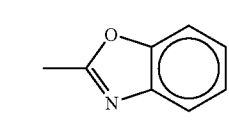 | 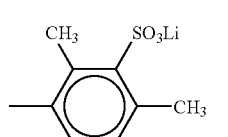 | 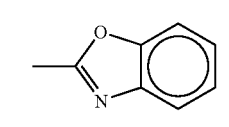 | 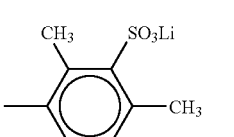 | 1.35 |
| M-19 | 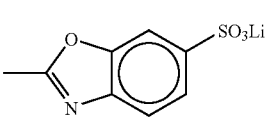 | 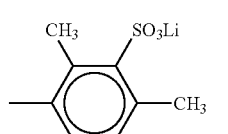 | 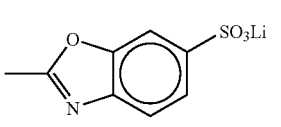 | 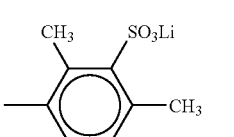 | 1.37 |

-continued
| | | | | |
|---|---|---|---|---|
| M-20 | 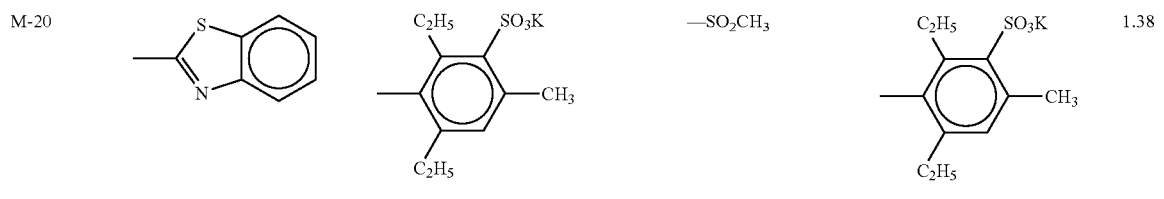 | —SO₂CH₃ | | 1.38 |
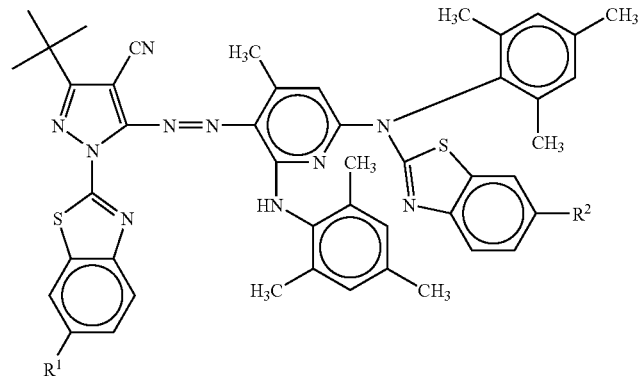
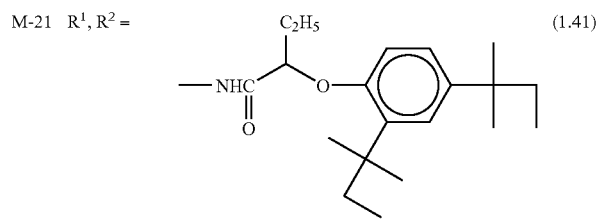
M-22 R¹ =
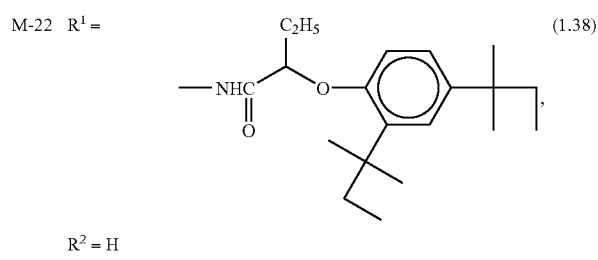
R² = H
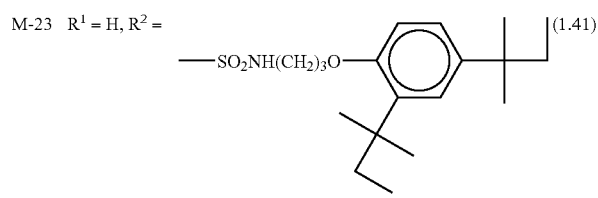
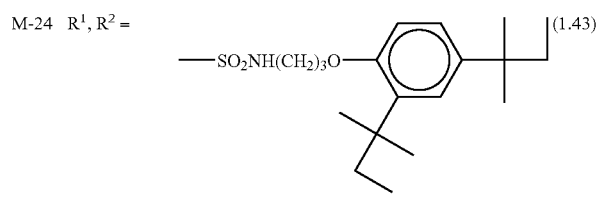

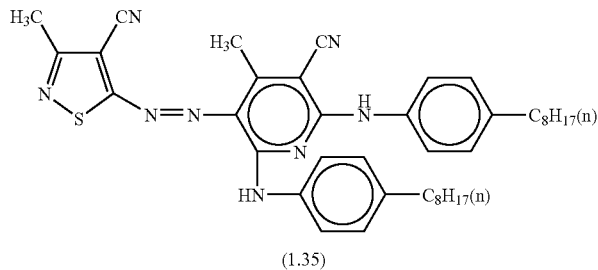
(1.35) M-25
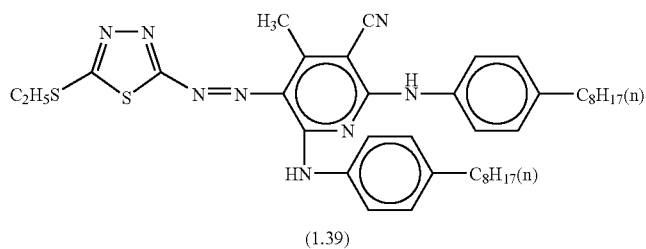
(1.39) M-26
Further, specific examples [C-1 to C-50] of the cyan dye used in the invention are shown below.
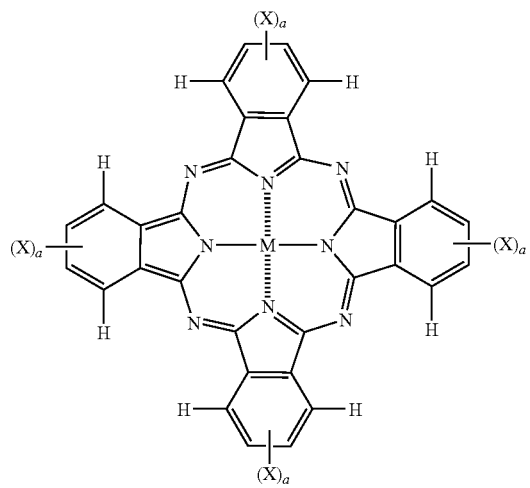
| Compound No. | M | X | ($\sigma_p$) | a | Oxidation Potential (V) |
|---|---|---|---|---|---|
| C-1 | Cu | —SO$_2$NH—〈 〉—NHCO—〈 〉—SO$_3$Na | (0.65) | 1 | 1.24 |
| C-2 | Cu | —SO$_2$N(CH$_3$)—〈 〉—SO$_3$Na | (0.65) | 1 | 1.19 |

-continued

| | | | | | |
|---|---|---|---|---|---|
| C-3 | Cu | —SO$_2$NH-CH$_2$CH$_2$-SO$_3$K | (0.65) | 1 | 1.18 |
| C-4 | Cu | —SO$_2$NH-(CH$_2$)$_3$-N(CH$_2$CH$_2$OH)$_2$ · HCl | (0.65) | 1 | 1.29 |
| C-5 | Cu | —SO$_2$NH-CH$_2$CH$_2$-OC$_2$H$_5$ | (0.65) | 1 | 1.23 |
| C-6 | Cu | —SO$_2$NH-C$_6$H$_3$(CO$_2$Na)$_2$ | (0.65) | 1 | 1.21 |
| C-7 | Cu | —SO$_2$NH-CH$_2$CH$_2$-CO$_2$K | (0.65) | 1 | 1.19 |
| C-8 | Cu | —SO$_2$(CH$_2$)$_3$SO$_2$NH—C$_6$H$_4$—SO$_3$K | (0.77) | 1 | 1.35 |
| C-9 | Cu | —SO$_2$-(benzothiazole)-SO$_3$K | (—) | 1 | 1.36 |
| C-10 | Cu | —SO$_2$-(CH$_2$)$_3$-SO$_3$Na | (0.77) | 2 | 1.39 |
| C-11 | Cu | —SO$_2$-(CH$_2$)$_3$-SO$_3$Li | | 1 | 1.29 |
| C-12 | Cu | —SO$_2$-(CH$_2$)$_3$-SO$_3$K | | 1 | 1.29 |
| C-13 | Cu | —SO$_2$—C$_6$H$_4$—O-(CH$_2$)$_4$-SO$_3$K | (0.68) | 1 | 1.29 |
| C-14 | Cu | —SO$_2$—C$_6$H$_4$—CO$_2$Na | (0.68) | 1 | 1.27 |

-continued

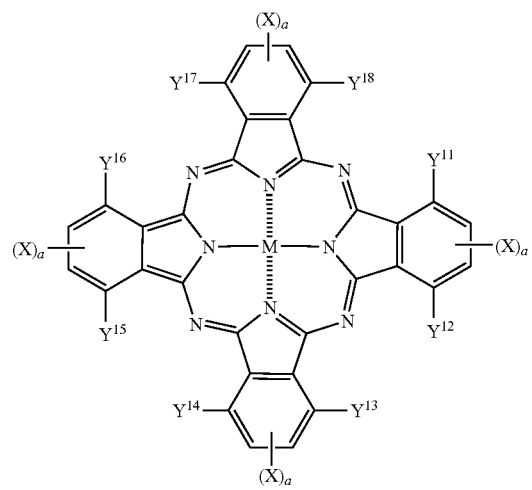

In the table there is no special order for the combinations of ($Y^{11}$, $Y^{12}$), ($Y^{13}$, $Y^{14}$), ($Y^{15}$, $Y^{16}$) and ($Y^{17}$, $Y^{18}$), and the combinations are independent of each other.

| Compound No. | M | X | [$\sigma_p$] | $Y^{11}$, $Y^{12}$ | $Y^{13}$, $Y^{14}$ | $Y^{15}$, $Y^{16}$ | $Y^{17}$, $Y^{18}$ | a | Oxidation Potential (V) |
|---|---|---|---|---|---|---|---|---|---|
| C-15 | Cu | —SO$_2$NH—C$_6$H$_4$—NHSO$_2$—C$_6$H$_4$—SO$_3$K | (0.65) | H, Cl | H, Cl | H, Cl | H, Cl | 1 | 1.24 |
| C-16 | Cu | —SO$_2$—(CH$_2$)$_3$—SO$_3$K | (0.77) | H, Cl | H, Cl | H, Cl | H, Cl | 1 | 1.38 |

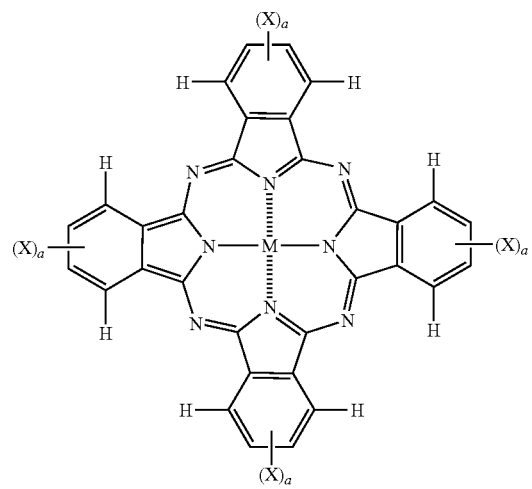

[Ka 26]

| Compound No. | M | X | [$\sigma_p$] | a | Oxidation Potential (V) |
|---|---|---|---|---|---|
| C-17 | Cu | —SO$_2$NH—C$_6$H$_4$—C$_8$H$_{17}$-n | (0.65) | 1 | 1.24 |

-continued

| | | | | | |
|---|---|---|---|---|---|
| C-18 | Cu | 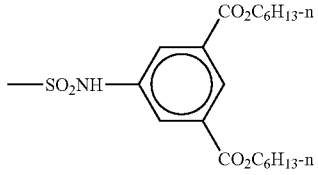 —SO₂NH—C₆H₃(CO₂C₆H₁₃-n)₂ | (0.65) | 1 | 1.25 |
| C-19 | Cu | 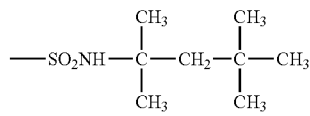 —SO₂NH—C(CH₃)₂—CH₂—C(CH₃)₃ | (0.65) | 1 | 1.22 |
| C-20 | Cu | 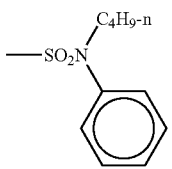 —SO₂N(C₄H₉-n)(C₆H₅) | (0.65) | 1 | 1.21 |
| C-21 | Cu | 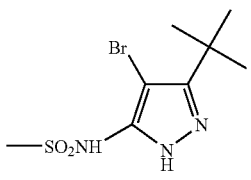 —SO₂NH-(4-Br, 3-t-Bu pyrazole) | (0.65) | 1 | 1.25 |
| C-22 | Cu | —SO₂(CH₂)₃SO₂NH(CH₂)₃OCH(CH₃)₂ | | 1 | 1.27 |
| C-23 | Cu | 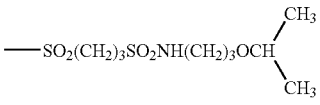 —SO₂—C₆H₃(OC₄H₉)(C₈H₁₇-t) | (0.68) | 1 | 1.28 |
| C-24 | Cu | —SO₂(CH₂)₃CO₂CH(CH₃)CH₂OCH₃ | | 1 | 1.29 |
| C-25 | Cu | —SO₂—C₁₂H₂₅-n | (0.77) | 1 | 1.28 |
| C-26 | Cu | —SO₂—(CH₂)₂NHCOCH(C₂H₅)(C₄H₉) | (0.77) | 1 | 1.28 |
| C-27 | Cu | —SO₂—(CH₂)₂CO₂C₆H₁₃-n | (0.77) | 1 | 1.31 |
| C-28 | Cu | —SO₂—C₈H₁₇-n | (0.77) | 2 | 1.36 |

$Cu—Pc—(SO_2R^1)_m(SO_2R^2)_n$

| Compound No. | $R^1$ | $(\sigma_p)$ | $R^2$ | $(\sigma_p)$ | m:n | Oxidation Potential (V) |
|---|---|---|---|---|---|---|
| C-29 | —C₁₂H₂₅(n) | (0.77) | —C₈H₁₇(n) | | 1:3 | 1.28 |
| C-30 | —C₈H₁₇(n) | (0.77) | 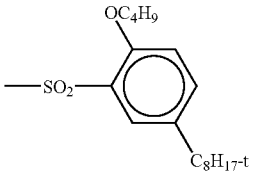 —C₆H₄—OC₄H₉(n) | (0.68) | 2:2 | 1.29 |

-continued

| Compound No. | R¹ | ($\sigma_p$) | (structure/group) | ($\sigma_p$) | m:n | Oxidation Potential (V) |
|---|---|---|---|---|---|---|
| C-31 | —(CH$_2$)$_2$CO$_2$C$_6$H$_{13}$(n) | (0.77) | 2-OC$_4$H$_9$, 3-CH$_3$, 5-CH$_3$ phenyl | (0.68) | 1:3 | 1.30 |
| C-32 | 2-OC$_4$H$_9$, 3-CH$_3$, 5-C$_8$H$_{17}$(t) phenyl | (0.68) | 4-OCH$_3$, 2-CH$_3$ phenyl | (0.68) | 3:1 | 1.32 |
| C-33 | 4-C$_{12}$H$_{25}$, 2-CH$_3$ phenyl | (0.68) | —C$_4$H$_9$(n) | (0.77) | 2:2 | 1.30 |
| C-34 | 4-C$_{12}$H$_{25}$, 2-CH$_3$ phenyl | | —C$_4$H$_9$(n) | | 1:3 | 1.30 |

$$\text{Cu}-\text{Pc}-(\text{SO}_2\text{R}^1)_m \left(\text{SO}_2\text{N}\begin{array}{c}\text{R}^3\\\text{R}^4\end{array}\right)_n$$

| Compound No. | R¹ | ($\sigma_p$) | —N(R³)(R⁴) | ($\sigma_p$) | m:n | Oxidation Potential (V) |
|---|---|---|---|---|---|---|
| C-35 | —C$_8$H$_{17}$(n) | (0.77) | —NHCH$_2$CH(C$_4$H$_9$(n))(C$_2$H$_5$) | (0.65) | 3:1 | 1.29 |
| C-36 | —C$_8$H$_{17}$(n) | | —N(C$_6$H$_{13}$(n))$_2$ | (0.65) | 1:3 | 1.25 |
| C-37 | —C$_8$H$_{17}$(n) | | —NH(CH$_2$)$_3$O—(2,4-di-t-C$_5$H$_{11}$ phenyl) | (0.65) | 3:1 | 1.28 |
| C-38 | 2-OC$_4$H$_9$, 3-CH$_3$, 5-C$_8$H$_{17}$(t) phenyl | (0.68) | —NH(CH$_2$)$_2$OC$_2$H$_5$ | (0.65) | 1:3 | 1.26 |
| C-39 | 2-OC$_4$H$_9$, 3-CH$_3$, 5-C$_8$H$_{17}$(t) phenyl | | —NHCH$_2$CO$_2$C$_8$H$_{17}$(n) | (0.65) | 2:2 | 1.28 |

-continued $$\text{Cu}-\text{Pc}-(\text{SO}_2\text{R}^1)_m(\text{SO}_2\text{R}^2)_n$$

| Compound No. | $R^1$ | $(\sigma_p)$ | $R^2$ | $(\sigma_p)$ | m:n | Oxidation Potential (V) |
|---|---|---|---|---|---|---|
| C-40 | —(CH$_2$)$_3$SO$_3$Li | | —(CH$_2$)$_3$SO$_2$NHCH$_2$CHCH$_3$ with OH | | 3:1 | 1.31 |
| C-41 | —(CH$_2$)$_3$SO$_3$Li | | —(CH$_2$)$_3$SO$_2$NHCH$_2$CHCH$_3$ with OH | | 2:2 | 1.31 |
| C-42 | —(CH$_2$)$_2$SO$_3$Li | | —(CH$_2$)$_3$SO$_2$NH(CH$_2$)$_2$O(CH$_2$)$_2$OH | | 2:2 | 1.30 |
| C-43 | —(CH$_2$)$_3$SO$_3$K | | phenyl-CO$_2$K | | 1:3 | 1.32 |
| C-44 | —(CH$_2$)$_3$SO$_3$K | | phenyl-CO$_2$K | | 3.5:0.5 | 1.30 |
| C-45 | —(CH$_2$)$_2$NHCO(CH$_2$)$_2$CO$_2$Na | (0.77) | —(CH$_2$)$_3$SO$_3$Na | (0.77) | 2:2 | 1.30 |
| C-46 | —(CH$_2$)$_2$NHCO(CH$_2$)$_2$CO$_2$Na | | —(CH$_2$)$_3$SO$_3$Na | | 1:3 | 1.30 |
| C-47 | —(CH$_2$)$_2$NHSO$_2$-phenyl-CO$_2$Na | (0.77) | —(CH$_2$)$_3$SO$_3$Na | | 1:3 | 1.31 |
| C-48 | —(CH$_2$)$_2$N(CH$_2$CO$_2$Na)$_2$ | | —(CH$_2$)$_3$SO$_3$Na | | 2:2 | 1.32 |

$$\text{Cu}-\text{Pc}-(\text{SO}_2\text{R}^1)_m \left(\text{SO}_2\text{N}\begin{matrix}R^3\\R^4\end{matrix}\right)_n$$

| Compound No. | $R^1$ | —N(R$^3$)(R$^4$) | $(\sigma_p)$ | m:n | Oxidation Potential (V) |
|---|---|---|---|---|---|
| C-49 | —(CH$_2$)$_3$SO$_3$K | —NH(CH$_2$)$_2$SO$_3$K | (0.65) | 3:1 | 1.29 |
| C-50 | —(CH$_2$)$_3$SO$_3$K | —NH(CH$_2$)$_2$SO$_3$K | | 2:2 | 1.28 |

In the specific examples of the dyes, "Cu—Pc—" represents a copper phthalocyanine structure.

In addition to the above, other examples of the compounds also usable in the invention are described in Japanese Patent Application Nos. 2002-294097, 2002-249677, 2002-156167, 2002-175386, 2003-012952, 2001-279145, and 2002-309116, to which, however, the invention is not limited. The compounds mentioned hereinabove may be readily produced according to the methods described in the patent publications referred to herein.

The amount of the dye included in an inkjet ink is preferably from 0.1 parts by mass to 20 parts by mass with respect to 100 parts by mass of the ink.

Boron Compound

At least one inkjet ink included in the ink set of the invention includes a water-soluble dye and at least one boron compound selected from the group consisting of boric acid, a borate and borax.

The boric acid or borate is preferably an acid containing a boron atom (such as boric acid, orthoboric acid, diboric acid, metaboric acid, tetraboric acid or pentaboric acid) or a salt thereof.

Examples of the boron compound include boric acid, borax, ammonium borate, lithium borate, hydrated lithium borate, sodium borate, hydrated sodium borate, potassium borate, hydrated potassium borate, hydrated aluminum borate, potassium metaborate, hydrated potassium metaborate, sodium metaborate, hydrated sodium metaborate, hydrated ammonium tetraborate, lithium tetraborate, hydrated lithium tetraborate, hydrated potassium tetraborate, sodium tetraborate, disodium tetraborate, hydrated sodium tetraborate, hydrated ammonium pentaborate and hydrated sodium peroxoborate.

When the amount of the boron compound is excessive, aggregation may be caused in the ink, which may result in the clogging of the ink head.

The amount of the boron compound included in the inkjet ink is preferably from 0.01 to 1% by mass, and more preferably from 0.05 to 0.5% by mass, with respect to the ink.

The inkjet ink used in the invention may include another additive as required in a range that does not disturb advantages of the invention. Examples of the additive include known additives such as a drying inhibitor (wetting agent), a fading inhibitor, an emulsion stabilizer, a penetration promoter, a UV absorbent, a preservative, an antifungal agent, a pH controlling agent, a surface tension-controlling agent, a defoaming agent, a viscosity stabilizer, a dispersant, a dispersion stabilizer, a rust inhibitor and a chelating agent.

The drying inhibitor is favorably used for preventing the inkjet ink from drying at the inkjet nozzle orifice used for inkjet recording and for preventing the nozzle from being clogged.

The drying inhibitor is preferably a water-soluble organic solvent having a vapor pressure lower than water. Specific examples thereof include: polyalcohols such as ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin and trimethylolpropane; lower alkyl ethers of polyalcohols, such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among these, polyalcohols such as glycerin and diethylene glycol are more preferred. One of the drying inhibitors may be used singularly, or a combination of at least two thereof may be used. The drying inhibitor is preferably included in the ink in an amount of from 10 to 50% by mass with respect to the ink.

The penetration promoter is favorably used for the purpose of more rapidly penetrating the inkjet ink into paper. Examples of the penetration promoter include alcohols such as ethanol, isopropanol, butanol, diethylene glycol monobutyl ether, triethylene glycol monobutyl ether and 1,2-hexanediol, sodium laurylsulfate, sodium oleate, and nonionic surfactants. When the penetration promoter is included in the ink in an amount of from 5 to 30% by mass, it is generally sufficiently effective. Preferably, the penetration promoter is used in an amount that does not cause print blur or print through.

The UV absorbent is for improving the image stability. For the UV absorbent, herein usable are benzotriazole compounds disclosed in JP-A 58-185677, 61-190537, 2-782, 5-197075, 9-34057; benzophenone compounds disclosed in JP-A46-2784, 5-194483, and U.S. Pat. No. 3,214,463; cinnamate compounds disclosed in JP-B 48-30492, 56-21141, and JP-A 10-88106; triazine compounds disclosed in JP-A 4-298503, 8-53427, 8-239368, 10-182621, and JP-T 8-501291 (the term "JP-T" as used herein means a published Japanese translation of a PCT patent application); compounds disclosed in Research Disclosure No. 24239; and other compounds capable of absorbing UV rays to emit fluorescence, or that is, fluorescent brighteners such as stilbene compounds and benzoxazole compounds.

The fading inhibitor is for improving the image stability. As the fading inhibitor, herein usable are various organic fading inhibitors or metal complex fading inhibitors. Examples of the organic fading inhibitors include hydroquinones, alkoxyphenols, dialkoxyphenols, phenols, anilines, amines, indanes, chromans, alkoxyanilines, thioethers and thioureas (examples of thioethers and thioureas are disclosed in JP-A 2002-36717, and examples of thioether are also disclosed in JP-A 2002-86904) and heterocyclic compounds. Examples of the metal complex fading inhibitor include nickel complexes and zinc complexes. More specifically, herein usable are the compounds described in the patent publications that are referred to in Research Disclosure No. 17643, Items VII-I to J, No. 15162, No. 18716, page 650, left column, No. 36544, page 527, No. 307105, page 872, and No. 15162, as well as the compounds that falls within the range of the general formula to indicate the typical compounds and the examples of the compounds described in pp. 127-137 of JP-A 62-215272.

Examples of the antifungal agent include sodium dehydroacetate, sodium benzoate, sodium pyridinethione-1-oxide, p-hydroxybenzoate ethyl ester, 1, 2-benzisothiazolin-3-one and salts thereof. The amount of the antifungal agent is preferably from 0.02 to 1.00% by mass in the ink.

As the pH controlling agent, a neutralizing agent (an organic salt or inorganic alkali) can be used. In order to improve storage stability of the inkjet ink, the pH controlling agent is added to the ink so that the pH of the inkjet ink may be kept preferably in the range of from 6 to 10 and more preferably in the range of from 7 to 10.

For the surface tension-controlling agent, usable are nonionic, cationic or anionic surfactants. Preferably, the surface tension of the inkjet ink used in the invention is from 25 and 70 mPa·s, more preferably from 25 to 60 mN/m. Also preferably, the viscosity of the inkjet ink used in the invention is 30 mPa·s or less, and more preferably 20 mPa·s or less. Preferred examples of the surfactants include anionic surfactants such as salts of fatty acids, salts of alkylsulfates, salts of alkylbenenesulfonates, salts of alkylnaphthalenesulfonates, salts of dialkylsulfosuccinates, salts of alkylphosphates, naphthalenesulfonic acid-formalin condensates, or salts of polyoxyethylene-alkylsulfates; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, or oxyethylene-oxypropylene block copolymers. Also preferred is SURFYNOL (registered name, manufactured by Air Products & Chemicals), that is an acetylene polyoxyethylene oxide surfactant. Still preferred are amine-oxide type amphoteric surfactants such as N,N-dimethyl-N-alkylamine oxides, and quaternary ammonium salt-containing betaine type amphoteric surfactants such as N,N-dimethyl-N-lauryl-carbomethyl ammonium. Also usable are the surfactants described in JP-A 59-157636, pp. 37-38, and Research Disclosure No. 308119 (1989).

For the defoaming agent, any of fluorine-containing compounds, silicone compounds, chelating agents such as EDTA and the like may be used as required.

When the dye used in the invention is oil-soluble, the dye may be dispersed in an aqueous medium, preferably as follows: colorant particles that contain the dye and an oil-soluble polymer are dispersed in an aqueous medium, as disclosed in JP-A Nos. 11-286637, 2001-240763, 2001-262039, 2001-247788; or the dye of the present invention is dissolved in a high-boiling-point organic solvent and then dispersed in an aqueous medium, as disclosed in JP-A Nos. 2001-262018, 2001-240763, and 2001-335734. Regarding the specific method, and the oil-soluble polymer, the high-boiling-point organic solvent, the additive and their amounts to be used in the process of dispersing the dye of the present invention in an aqueous medium, those described in the above-mentioned patent publications may preferably be used. If desired, the dye may be directly dispersed in solid particles. In this stage, a dispersant or a surfactant may be used. The dispersing apparatus may be any of simple stirrers, impeller-assisted stirrers, in-line stirrers, mills (e.g., colloidal mills, ball mills, sand mills, attritors, roll mills, agitator mills), ultrasonic stirrers, and high-pressure emulsifying dispersers (high-pressure homogenizers, such as commercially-available Gaulin homogenizer, microfluidizer, DeBEE2000). The method of preparing the inkjet recording ink is described in detail also in JP-A Nos. 5-148436, 5-295312, 7-97541, 7-82515, 7-118584, 11-286637 and 2001-271003, in addition to the above-mentioned patent publications, and the descriptions in these may apply to the preparation of inkjet recording ink in the invention.

The aqueous medium includes water as the essential ingredient, and it may be a mixture that contains a water-miscible organic solvent, as required. Examples of the water-miscible organic solvent include alcohols (e.g., methanol, ethanol, propanol, isopropanol, butanol, isobutanol, sec-butanol, t-butanol, pentanol, hexanol, cyclohexanol, benzyl alcohol), polyalcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylenimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the above-mentioned water-miscible organic solvents may be used as a combination.

For the dye in each ink, employable is any of the above-mentioned various dyes. In general, the ink may be prepared by dissolving and/or dispersing the dye in a lipophilic medium or an aqueous medium. Preferably, an aqueous medium is used for it.

When two or more different inks are used for the same color in the invention, it is desirable that the ink concentration of one ink is from 0.05 to 0.5 times that of the other ink.

The ink set in the invention may be used for forming full-color images. For further toning the images, a black ink may be additionally used in the ink set. Examples of the black colorant usable in the black ink include disazo dyes, trisazo dyes, tetrazo dyes, and carbon black dispersion.

Inkjet Recording Sheet

An inkjet recording sheet used in the invention has a support and a colorant-receiving layer on the support, in which the colorant-receiving layer includes at least inorganic fine particles, a water-soluble resin and at least one boron compound selected from the group consisting of boric acid, borate and borax, and a ratio of the boron compound to the water-soluble resin (the boron compound/the water-soluble resin) is from 5% by mass to 14% by mass. Specific examples of the boron compound used in the inkjet recording sheet are as mentioned above.

Water-Soluble Resin

Examples of the water-soluble resin include polyvinyl alcohol resins which have a hydroxyl group as a hydrophilic structural unit [e.g., polyvinyl alcohol (PVA), acetoacetyl-modified polyvinyl alcohol, cation-modified polyvinyl alcohol, anion-modified polyvinyl alcohol, silanol-modified polyvinyl alcohol, polyvinylacetal], cellulose resins [e.g., methyl cellulose (MC), ethyl cellulose (EC), hydroxyethyl cellulose (HEC), carboxymethyl cellulose (CMC), hydroxypropyl cellulose (HPC), hydroxyethylmethyl cellulose, hydroxypropylmethyl cellulose], chitins, chitosans, starches, ether bond-containing resins [e.g., polyethylene oxide (PEO), polypropylene oxide (PPO), polyethylene glycol (PEG), polyvinyl ether (PVE)], and carbamoyl group-containing resins [e.g., polyacrylamide (PAAM), polyvinylpyrrolidone (PVP), polyacrylic hydrazide].

Examples thereof further include polyacrylic acid salts having a carboxyl group as a dissociable group, maleic acid resins, alginic acid salts, and gelatins.

Of these, particularly preferred are polyvinyl alcohol resins. Examples of the polyvinyl alcohol usable herein include those described in JP-B 4-52786, 5-67432, 7-29479; Japanese Patent No. 2,537,827; JP-B 7-57553; Japanese Patent Nos. 2,502,998, 3, 053, 231; JP-A63-176173; Japanese Patent No. 2,604,367; JP-A7-276787, 9-207425, 11-58941, 2000-135858, 2001-205924, 2001-287444, 62-278080, 9-39373; Japanese Patent No. 2,750,433; and JP-A2000-158801, 2001-213045, 2001-328345, 8-324105, 11-348417, 58-181687, 10-259213, 2001-72711, 2002-103805, 2000-63427, 2002-308928, 2001-205919, and 2002-264489.

Examples of water-soluble resins other than the polyvinyl alcohol resins, which are also usable herein include the compounds described in JP-A 2001-205919, 2002-264489, and paragraphs [0011] to [0012] of JP-A 11-165461.

The water-soluble resin to be used in the invention is particularly preferably the polyvinyl alcohols.

One or more of these water-soluble resins may be used herein either singly or as a combination.

The amount of the water-soluble resin in the invention is preferably from 9 to 40% by mass, and more preferably from 12 to 33% by mass, with respect to the total solid content of the colorant-receiving layer.

Inorganic Fine Particles

In the inkjet recording sheet of the invention, the colorant-receiving layer includes inorganic fine particles.

When the colorant-receiving layer includes inorganic fine particles and a water-soluble resin, a porous structure is obtained, whereby ink absorption performance is improved. In particular, when the solid content of the inorganic fine particles in the colorant-receiving layer is 50% by mass or more or, more preferably, exceeds 60% by mass, a more favorable porous structure may be formed, whereby a preferable inkjet recording sheet having sufficient ink absorption is obtained. Herein, the solid content of the inorganic fine particles in the colorant-receiving layer is an amount calculated based on the components other than water in the composition used to form the colorant-receiving layer.

In the invention, organic fine particles may be used together with the inorganic fine particles as required.

The organic particles are preferably polymer particles that are obtained, for example, through emulsion polymerization, microemulsion polymerization, soap-free polymerization, seed polymerization, dispersion polymerization or suspension polymerization. Examples of the organic particles include powdery, latex or emulsion polymer particles of, for example, polyethylene, polypropylene, polystyrene, polyacrylate, polyamide, silicone resin, phenolic resin or natural polymers.

Examples of the inorganic particles include silica particles, colloidal silica, titanium dioxide, barium sulfate, calcium silicate, zeolite, kaolinite, halloysite, mica, talc, calcium carbonate, magnesium carbonate, calcium sulfate, pseudo-boehmite, zinc oxide, zinc hydroxide, alumina, aluminum silicate, calcium silicate, magnesium silicate, zirconium oxide, zirconium hydroxide, cerium oxide, lanthanum oxide and yttrium oxide. Of those, preferred are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 μm or less, and more preferably 200 nm or less.

More preferred for use in the invention are silica particles having an average primary particle diameter of 30 nm or less, colloidal silica having an average primary particle diameter of 30 nm or less, alumina particles having an average primary particle diameter of 20 nm or less, or pseudo-boehmite having a mean pore radius of from 2 to 15 nm; and even more preferred are such silica particles, alumina particles or pseudo-boehmite.

Generally depending on their production method, silica particles are grouped into two types, wet-process particles and dry-process (vapor phase-process or fumed) particles. In the wet process, active silica is formed through acidolysis of silicates, and this is polymerized to a suitable degree and flocculated to obtain hydrous silica. This is the mainstream of the process. On the other hand, a vapor-phase process includes two types; one includes high-temperature vapor-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). These two are the main stream of the vapor-phase process. The "fumed silica" means to indicate anhydrous silica particles obtained in the vapor-phase process. For the silica particles used in the invention, especially preferred are the fumed silica particles.

The fumed silica differs from hydrous silica in point of the density of the surface silanol group and of the presence or absence of pores therein, and the two different types of silica have different properties. The fumed silica is suitable for forming a three-dimensional structure of high porosity. Though not clear, the reason may be because the silanol group density in the surfaces of the particles of hydrous silica is high, specifically from 5 to 8 groups/nm$^2$, and the silica particles may readily densely aggregate, while, on the other hand, the silanol group density in the surfaces of the fumed silica particles is low, specifically from 2 to 3 groups/nm$^2$, and the particles sparsely flocculate, therefore forming a structure of high porosity.

Since the fumed silica has a particularly large specific surface area, its ink absorption and retention are high. In addition, since its refractive index is large, the colorant-receiving layer that contains it can be kept transparent so far as the silica particles are dispersed to fall within a suitable particle size range, and the layer may form good color images of high color density. The transparency of the colorant-receiving layer is a matter of importance not only for OHP sheets that require transparency but also for other recording sheets such as photographic glossy paper, for forming good color images of high color density and glossiness.

Preferably, the vapor-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity, and effectively increase the ink absorbability of the layer containing them.

If desired, the silica particles may be combined with any other particles mentioned above. When the fumed silica is combined with any other particles, the ratio of the fumed silica is preferably at least 30% by mass, more preferably at least 50% by mass of all the particles to be included in the layer.

For the inorganic particles used in the invention, also preferred are alumina particles, alumina hydrate and their mixtures or composites. Of those, alumina hydrate is preferred as it well absorbs and fixes ink, and pseudo-boehmite ($Al_2O_3 \cdot nH_2O$) is more preferred. The alumina hydrate of any morphology may be used herein, but boehmite sol is more preferred as it readily forms a smooth layer.

Regarding the microstructure of pseudo-boehmite for use herein, the mean pore radius thereof is preferably from 1 to 30 nm, and more preferably from 2 to 15 nm. Also preferably, the pore volume thereof is from 0.3 to 2.0 cc/g, and more preferably from 0.5 to 1.5 cc/g. The pore radius and the pore volume are measured through nitrogen adsorption/desorption, using, for example, a gas adsorption/desorption analyzer (e.g., Coulter's trade name, OMNISORP 369).

In particular, fumed alumina particles are especially preferred for use herein as their specific surface area is large. Also preferably, the fumed alumina particles have an average primary particle diameter of 30 nm or less, and more preferably 20 nm or less.

When the particles mentioned above are used in the inkjet recording sheet in the invention, for example, the embodiments disclosed in JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314 are preferably employed.

The above-mentioned water-soluble resin that is the essential ingredient of the colorant-receiving layer in the invention may be the same as the material of the particles to be in the layer, or alternatively, a mixed system of different materials may be used in forming the layer.

For making the colorant-receiving layer transparent, the type of the water-soluble resin to be combined with the particles, especially the silica particles in the layer is a matter of importance. In the case where the fumed silica is used for the particles, the water-soluble resin to form the layer is preferably a polyvinyl alcohol resin, and more preferably a polyvinyl alcohol resin having a saponification degree of from 70 to 100%, and even more preferably from 80 to 99.5%.

The polyvinyl alcohol resin has a hydroxyl group in its structural units, and the hydroxyl group therein forms a hydrogen bond with the silanol group in the surfaces of the silica particles, therefore facilitating the formation of a three-dimensional network structure of the chain units of secondary silica particles. It is believed that the three-dimensional network structure thus formed will make the colorant-receiving layer have a porous structure of high porosity.

During inkjet recording, the porous colorant-receiving layer thus formed in the manner as above rapidly absorbs ink through the capillary action therein, and forms ink dots of excellent circularity with no bleeding.

The polyvinyl alcohol resin may be combined with any other water-soluble resin. When the polyvinyl alcohol resin is combined with any additional water-soluble resin, the amount of the polyvinyl alcohol resin is preferably at least 50% by mass, and more preferably at least 70% by mass with respect to all of the water-soluble resins.

Ratio of Particles to Water-soluble Resin

The ratio by mass of the particles (x) to the water-soluble resin (y), PB ratio x/y, has some significant influence on the film structure and the film strength of the colorant-receiving layer. Specifically, when the ratio by mass, PB ratio, is large, the porosity, the pore volume and the surface area (per the unit mass) of the layer are all high but the density and the strength thereof tend to decrease.

In the colorant-receiving layer in the invention, the ratio by mass, PB ratio x/y, is preferably from 1.5/1 to 10/1 for the following reasons: when the PB ratio is too large, the film strength of the layer is low and the layer readily cracks in dry; but when too small, the resin will fill up the pores in the layer to lower the layer porosity, and the ink absorbability of the layer will be thereby lowered. To evade the problems, the PB ratio is preferably within the range as above.

While passing through the conveyor system in an inkjet printer, the recording sheet may receive stress, and therefore the strength of its colorant-receiving layer must be high. In addition, when the sheet is cut, its colorant-receiving layer should not crack or peel, and therefore the strength of the layer must be high. Taking these into consideration, the ratio by mass, x/y, is preferably 5/1 or less. In order that the layer has the ability to rapidly absorb ink in inkjet printers, the ratio is more preferably at least 2/1.

For instance, when a coating solution prepared by completely dispersing vapor-phase silica fine particles (x) having an average primary particle diameter of 20 nm or less and a water-soluble resin (y) at a mass ratio (x/y) of from 2/1 to 5/1 in an aqueous solution is applied on a support and the coated layer is dried, a three-dimensional network structure having secondary particles of the silica fine particles as a network chain unit is formed, whereby a transparent porous film having an average pore diameter of 30 nm or less, the porosity of from 50 to 80%, a pore specific volume of 0.5 ml/g or more and a specific surface area of 100 m$^2$/g or more is readily formed.

Crosslinking Agent

The colorant-receiving layer in the inkjet recording sheet in the invention is a coating layer that includes the above-mentioned water-soluble resin, and it is desirable that the layer further includes a crosslinking agent capable of crosslinking the water-soluble resin therein. More preferably, the layer includes both the above-mentioned particles and the above-mentioned water-soluble resin, and it is cured through crosslinking of the water-soluble resin with the crosslinking agent therein to form a porous layer.

When polyvinyl alcohol is used as a water-soluble resin, the boron compound acts as a curing agent for the polyvinyl alcohol.

As the crosslinking agent for the water-soluble resin, besides the boron compounds, the following compounds may be used.

Examples of the crosslinking agent include: aldehyde compounds such as formaldehyde, glyoxal or glutaraldehyde; ketone compounds such as diacetyl or cyclopentanedione; active halogen compounds such as bis(2-chloroethylurea)-2-hydroxy-4,6-dichloro-1,3,5-triazine or 2,4-dichloro-6-S-triazine sodium salt; active vinyl compounds such as divinyl-sulfonic acid, 1,3-vinylsulfonyl-2-propanol, N,N'-ethylenebis(vinylsulfonylacetamide) or 1,3,5-triacryloyl-hexahydro-S-triazine; N-methylol compounds such as dimethylolurea or methylol dimethylhydantoin; melamine resins such as methylolmelamine or alkylated methylolmelamine; epoxy resins;

isocyanate compounds such as 1,6-hexamethylene diisocyanate; aziridine compounds described in U.S. Pat. Nos. 3,017,280 or 2,983,611; carboximide compounds described in U.S. Pat. No. 3,100,704; epoxy compounds such as glycerol triglycidyl ether; ethylenimino compounds such as 1,6-hexamethylene-N,N'-bisethyleneurea; halogenocarboxyaldehyde compounds such as mucochloric acid, mucophenoxychloric acid; dioxane compounds such as 2,3-dihydroxydioxane; metal-containing compounds such as titanium lactate, aluminum sulfate, chromium alum, potassium alum, zirconyl acetate, or chromium acetate; polyamine compounds such as tetraethylpentamine; hydrazide compounds such as adipic dihydrazide; and low-molecular or polymer compounds having at least two oxazoline groups.

One or more of the above-mentioned crosslinking agents may be used herein either singly or as combined.

Preferably, the colorant-receiving layer is crosslinked and cured in the manner as follows: a basic solution having pH of 7.1 or more (hereinafter referred to as "coating solution B") is applied onto the coating layer, with a crosslinking agent being added to the coating solution that contains particles and a water-soluble resin (hereinafter referred to as "coating solution A") and/or to the basic solution, either (1) at the same time that the coating solution A is applied onto the support to form the coating layer or (2) in the course of drying the coating layer formed by applying the coating solution A onto the support before the coating layer exhibits a falling rate of drying. The pH of the basic solution is preferably 7.5 or more, and more preferably 8 or more.

The crosslinking agent is preferably added in the following manner when a boron compound is taken as an example. That is, in the case where an colorant-receiving layer is a layer formed by crosslinking and curing a coated layer obtained by applying the coating solution (coating solution A) including the fine particles and the water-soluble resin containing a polyvinyl alcohol, the crosslinking and curing are carried out by applying a basic solution (coating solution B) having a pH of 7.1 or more to the coated layer, either (1) at the same time that the coating solution (coating solution A) is applied to form a coated layer or (2) during the course of drying the coated layer formed by applying the coating solution and before the coated layer exhibits a falling rate of drying. The boron compound as the crosslinking agent may be contained in either the coating solution A or the coating solution B, or in both the coating solutions A and B.

A ratio of the boron compound and the water-soluble resin (boron compound/water-soluble resin) in the colorant-receiving layer is from 5% by mass to 14% by mass, more preferably from 6% by mass to 12% by mass, and particularly preferably from 6% by mass to 10% by mass. When the ratio of the boron compound and the water-soluble resin in the colorant-receiving layer is less than 5% by mass, absorption failure of the ink, deterioration of black density or bronzing may be caused. On the other hand, when the ratio of the boron compound and the water-soluble resin is more than 14% by mass, thickening of the coating solution, the glossiness difference between an image portion and a non-image portion or film cracking may be caused.

Mordant

The colorant-receiving layer in the invention may further include at least one inorganic mordant.

As the inorganic mordant, polyvalent water-soluble metal salts and hydrophobic metal salt compounds may be used.

Specific examples of the inorganic mordant include salts or complexes of metals selected from the group consisting of magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

More specific examples of the inorganic mordant include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, copper(II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, aluminum sulfite, aluminum thiosulfate, polyaluminum chloride (basic polyaluminum hydroxide), basic aluminum lactate, basic aluminum sulfate, basic aluminum nitrate, basic aluminum acetate, basic aluminum formate, basic aluminum sulfamate, basic aluminum glycinate, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl lactate, zirconyl succinate, zirconyl oxalate, zirconyl sulfate, ammonium zirconium carbonate, potassium zirconium carbonate, sodium zirconium lactate, basic zirconium glycinate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphotungstate, sodium tungsten citrate, 12-tungstophosphoric acid n-hydrate, 12-tungstosilicic acid 26-hydrate, molybdenum chloride, 12-molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, and bismuth nitrate.

For the inorganic mordant used in the invention, preferred are aluminum-containing compounds, titanium-containing compounds, zirconium-containing compounds, and metal compounds (salts or complexes) of the Group IIIB metals of the Periodic Table of Elements.

Particularly preferred are aluminum-containing compounds and zirconium-containing compounds.

More preferred are water-soluble aluminum compounds (e.g., aluminum sulfate, aluminum alum, aluminum sulfite, aluminum thiosulfate, polyaluminum chloride, aluminum nitrate nonahydrate, aluminum chloride hexahydrate), and water-soluble zirconium compounds (e.g., zirconyl acetate, zirconyl sulfate, zirconium ammonium carbonate, zirconyl nitrate, zirconium oxychloride, zirconium hydroxychloride). Even more preferred is polyaluminum chloride.

One or more of these inorganic mordants may be used either singly or as combined. When used in combination, it is preferred to include at least an aluminum-containing compound or a zirconium-containing compound. It is more preferred to use a combination of an aluminum-containing compound and a zirconium-containing compound.

An amount of the mordant included in the colorant-receiving layer of the invention is preferably from 0.01 to 5 g/m$^2$ and more preferably from 0.1 to 3 g/m$^2$.

In the colorant-receiving layer in the invention, the inorganic mordant may be combined with an organic mordant for improving the waterproofness and the bleeding resistance in storage of the images formed therein.

The organic mordant is preferably a cationic polymer (cationic mordant). The mordant in the colorant-receiving layer interacts with the colorant, anionic dye in liquid ink and stabilizes the colorant, and therefore improves the waterproofness and the bleeding resistance in storage of the formed images. Different types of the organic mordant and the inorganic mordant may be combined for use herein.

The mordant may be added to the coating liquid A that includes particles and a water-soluble resin. However, when the mordant may react with the particles in the liquid to form aggregates, the mordant may be added to the coating liquid B.

For the cationic mordant, a polymer mordant having, as a cationic group, a primary to tertiary amino group or a quaternary ammonium base is preferably used, but a cationic nonpolymer mordant may also be used.

As the polymer mordant, a homopolymer of a monomer (hereinafter may be referred to as "mordant monomer") having a primary to tertiary amino group or a salt thereof or a quaternary ammonium salt group, or a copolymer or condensed polymer of the mordant monomer and other monomers (hereinafter may be referred to as "non-mordant monomer") is preferable. The polymer mordant may be used in either form of a water-soluble polymer or water-dispersible latex particles.

Examples of the monomer (mordant monomer) include trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride;

trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, and N,N-diethyl-N-methyl-N-2-(4-vinylphenyl)ethyl ammonium acetate;

quaternates with methyl chloride, ethyl chloride, methyl bromide, ethyl bromide, methyl iodide or ethyl iodide of N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl(meth)acrylamide, N,N-diethylaminoethyl(meth)acrylamide, N,N-dimethylaminopropyl(meth)acrylamide, or N,N-diethylaminopropyl(meth)acrylamide, and their anion-substituted sulfonates, alkylsulfonates, acetates and alkylcarboxylates.

Specific examples thereof include monomethyldiallyl ammonium chloride, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy)ethyl ammonium chloride, trimethyl-3-(methacryloyloxy)propyl ammonium chloride, triethyl-3-(methacryloyloxy)propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamino)ethyl ammonium chloride, trimethyl-3-(methacryloylamino)propyl ammonium chloride, triethyl-3-(methacryloylamino)propyl ammonium chloride, trimethyl-3-(acryloylamino)propyl ammonium chloride and triethyl-3-(acryloylamino)propyl ammonium chloride;

N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate and trimethyl-3-(acryloylamino)propylammonium acetate.

Other than these, N-vinyl imidazole and N-vinyl-2-methylimidazole may be used as a copolymerizable monomer.

Also usable are allylamine, diallylamine and their derivatives and salts. Examples of the compounds include allylamine, allylamine hydrochloride, allylamine acetate, allylamine sulfate, diallylamine, diallylamine hydrochloride, diallylamine acetate, diallylamine sulfate, diallylmethylamine and salts thereof (e.g., hydrochloride, acetate, sulfate thereof), diallylethylamine and salts thereof (e.g., hydrochloride, acetate, sulfate thereof), and diallyldimethylammonium salt (its counter anion includes a chloride, sulfate, or acetate ion). These allylamine and diallylamine derivatives are poorly polymerizable when they are in the form of free amines. In general, therefore, the salts thereof are polymerized and the resultant polymers are optionally desalted.

Further, a unit of N-vinylacetamide or N-vinylformamide may also be used, and the polymers formed are hydrolyzed to form vinylamine units, and they may be further converted into their salts for use herein.

The non-mordant monomer does not contain a basic or cationic moiety of primary to tertiary amino groups and salts thereof or quaternary ammonium bases, and does not interact with a dye in inkjet ink or substantially poorly interacts with the dye.

Examples of the non-mordant monomer include alkyl (meth)acrylates; cycloalkyl (meth)acrylates such as cyclohexyl (meth)acrylate; aryl (meth)acrylates such as phenyl (meth)acrylate; aralkyl esters such as benzyl (meth)acrylate; aromatic vinyl compounds such as styrene, vinyltoluene and α-methylstyrene; vinyl esters such as vinyl acetate, vinyl propionate, vinyl versatate; allyl esters such as allyl acetate; halogen-containing monomers such as vinylidene chloride or vinyl chloride; vinyl cyanides such as (meth)acrylonitrile; and olefins such as ethylene and propylene.

Of the alkyl (meth)acrylates, those in which the alkyl moiety has from 1 to 18 carbon atoms are preferred. Examples thereof include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate.

Of those, more preferred are methyl acrylate, ethyl acrylate, methyl methacrylate, ethyl methacrylate and hydroxyethyl methacrylate.

One or more of the non-mordant monomers may be used singly or as combined.

Other preferred examples of the polymer mordant include polydiallyldimethylammonium chloride, copolymers of diallyldimethylammonium chloride and other monomer (mordant monomer or non-mordant monomer), diallyldimethylammonium chloride-$SO_2$ copolymer, cyclic amine resins and derivatives thereof (including copolymers thereof) such as polydiallylmethylamine hydrochloride or polydiallyl hydrochloride; secondary amino, tertiary amino or quaternary ammonium salt substituted alkyl(meth)acrylate polymers and their copolymers with other monomer such as polydiethylmethacryloyloxyethylamine, polytrimethylmethacryloyloxyethylammonium chloride, polydimethylbenzylmethacryloyloxyethylammonium chloride, or polydimethylhydroxyethylacryloyloxyethylammonium chloride; polyamine resins such as polyethylenimine and derivatives thereof, polyallylamine and derivatives thereof, and polyvinylamine and derivatives thereof, polyamide resins such as a polyamide-polyamine resin and a polyamidepichlorohydrin resin; polysaccharides such as cationated starch, chitosan and derivatives thereof, dicyandiamide derivatives such as dicyandiamide-formalin polycondensate, and dicyandiamide-diethylenetriamine polycondensate; polyamidine and its derivatives; dialkylamine-epichlorohydrin addition polymer products and derivative thereof such as dimethylamine-epichlorohydrin addition polymer products; and styrene polymers having a quaternary ammonium salt-substituted alkyl group and its copolymers with other monomer.

For the polymer mordant, for example, herein usable are those specifically described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236; U.S. Pat. Nos. 2,484,430, 2,548,564, 3,148,061, 3,309,690, 4,115,124, 4,124,386, 4,193,800, 4,273,853, 4,282,305, 4,450,224; JP-A Nos. 1-161236, 10-81064, 10-157277, 10-217601, 2001-138621, 2000-211235, 2001-138627, 8-174992; JP-B Nos. 5-35162, 5-35163, 5-35164, 5-88846; and Japanese Patent Nos. 2,648,847, and 2,661,677.

When an inorganic mordant and an organic mordant are used in combination, the ratio thereof may be determined by a balance between the storability and prevention of blurring. The ratio of the inorganic mordant among the mordants used is thus 5% or more and preferably 10% or more. The total amount of the mordants in the layer is preferably from 0.01 to 5 $g/m^2$ and more preferably from 0.1 to 3 $g/m^2$.

Other Components

If desired, the inkjet recording sheet in the invention may further include various known additives such as an acid, a UV absorbent, an antioxidant, a fluorescent brightener, a monomer, a polymerization initiator, a polymerization inhibitor, a bleeding inhibitor, a preservative, a viscosity stabilizer, a defoaming agent, a surfactant, an antistatic agent, a matting agent, a curl inhibitor or a water-proofing agent.

In the invention, the colorant-receiving layer may include an acid. By adding an acid, the surface of the colorant-receiving layer is controlled to have a pH of from 3 to 8, and preferably from 4 to 6. This is favorable since the yellowing resistance of the white background of the sheet is improved. The surface pH may be measured according to the surface pH measurement method A (coating method) defined by the Technical Association of the Pulp and Paper Industry of Japan (J. TAPPI). For example, a paper surface pH meter, Kyoritsu Rikagaku Institute's Model MPC for the method A is used.

Examples of the acid include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, metal salicylates (salts with Zn, Al, Ca, Mg or the like), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, α-resorcinolic acid, β-resorcinolic acid, γ-resorcinolic acid, gallic acid, phloroglucine, sulfosalicylic acid, ascorbic acid, erysorbic acid, bisphenolic acid, hydrochloric acid, nitric acid, sulfuric acid, phosphoric acid, polyphosphoric acid, boric acid, boronic acid and the acidic organic or inorganic mordant. The amount of the acid to be added may be so determined that the surface pH of the colorant-receiving layer may be from 3 to 8.

The acid may be used in a form of either a metal salt (salt of such as sodium, potassium, calcium, cesium, zinc, copper, iron, aluminum, zirconium, lanthanum, yttrium, magnesium, strontium, or cerium) or an amine salt (such as ammonia, triethylamine, tributylamine, piperazine, 2-methylpiperazine or polyallylamine).

Preferably, the colorant-receiving layer in the invention includes storage stability improver such as a UV absorbent, an antioxidant or a bleeding inhibitor.

For the UV absorbent, antioxidant or bleeding inhibitor, for example, usable are alkylated phenol compounds (including hindered phenol compounds); alkylthiomethylphenol compounds; hydroquinone compounds; alkylated hydroquinone compounds; tocopherol compounds; aliphatic compounds, aromatic compounds, and/or heterocyclic compounds having thioether bonds; bisphenol compounds; O—, N- and S-benzyl compounds; hydroxybenzyl compounds; triazine compounds; phosphonate compounds; acylaminophenol compounds; ester compounds; amide compounds; ascorbic acid; amine antioxidants; 2-(2-hydroxyphenyl)benzotriazole compounds; 2-hydroxybenzophenone compounds; acrylates; water-soluble or hydrophobic metal salts; organic metal compounds; metal complexes; hindered amine compounds (including TEMPO compounds); 2-(2-hydroxyphenyl)-1,3,5-triazine compounds; metal inactivators; phosphite compounds; phosphonite compounds; hydroxyamine compounds; nitroso compounds; peroxide scavengers; polyamide stabilizers; polyether compounds; basic assistant stabilizers; nucleating agents; benzofuranone compounds; indolinone compounds; phosphine compounds; polyamine compounds; thiourea compounds; urea compounds; hydrazide compounds; amidine compounds; saccharide compounds; hydroxybenzoic acid compounds; dihydroxybenzoic acid compounds; and trihydroxybenzoic acid compounds.

Of those, preferred are alkylated phenol compounds, aliphatic compounds, aromatic compounds, and/or heterocyclic compounds having thioether bonds, bisphenol compounds, ascorbic acid, amine antioxidants, water-soluble or hydrophobic metal salts, organic metal compounds, metal complexes, hindered amine compounds, hydroxyamine compounds, polyamine compounds, thiourea compounds, hydrazide compounds, hydroxybenzoic acid compounds, dihydroxybenzoic acid compounds and trihydroxybenzoic acid compounds.

Examples of specific compounds thereof include those described in JP-A Nos. 2002-36717, 2002-86904, 2002-307822, 10-182621 and 2001-260519, Japanese Patent Application Publication (JP-B) Nos. 4-34953 and 4-34513, JP-A No. 11-170686, JP-B No. 4-34512, EP 1138509, JP-A Nos. 60-67190, 7-276808, 2001-94829, 47-10537, 58-111942, 58-212844, 59-19945, 59-46646, 59-109055 and 63-53544, JP-B Nos. 36-10466, 42-26187, 48-30492, 48-31255, 48-415072, 48-54965 and 50-10726, U.S. Pat. Nos. 2,719,086, 3,707,375, 3,754,919 and 4,220,711, JP-B Nos. 45-4699 and 54-5324, European Patent Laid-Open Nos. 223739, 309401, 309402, 310551, 310552 and 459416, German Patent Laid-Open No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, JP-A Nos. 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-170361; JP-B 48-43295, 48-33212; and U.S. Pat. Nos. 4,814,262, and 4,980,275.

The other components may be used singularly or as a mixture of at least two thereof. The other components may be added after being rendered water-soluble or dispersible, or as a polymer dispersion, an emulsion or oil droplets, or encapsulated in microcapsules. An amount of the other components added to the ink jet recording sheet of the invention is preferably from 0.01 to 10 g/m$^2$.

For improving the dispersibility of the inorganic particles, the surfaces of the inorganic particles may be treated with a silane coupling agent. Preferably, the silane coupling agent has an organic functional group (e.g., a vinyl group, an amino group (primary to tertiary amino group, quaternary ammonium salt group), an epoxy group, a mercapto group, a chloride group, an alkyl group, a phenyl group, an ester group or a thioether group), in addition to the coupling-active site thereof.

The coating liquid for the colorant-receiving layer in the invention preferably includes a surfactant. The surfactant may be any of a cationic surfactant, an anionic surfactant, a nonionic surfactant, an amphoteric surfactant, a fluorine-containing surfactant and a silicone surfactant.

Examples of the nonionic surfactant include polyoxyalkylene alkyl ethers and polyoxyalkylene alkylphenyl ethers (e.g., diethylene glycol monoethyl ether, diethylene glycol diethyl ether, polyoxyethylene lauryl ether, polyoxyethylene stearyl ether, polyoxyethylene nonylphenyl ether), oxyethylene-oxypropylene block copolymers, sorbitan fatty acid esters (e.g., sorbitan monolaurate, sorbitan monooleate, sorbitan trioleate), polyoxyethylene-sorbitan fatty acid esters (e.g., polyoxyethylene-sorbitan monolaurate, polyoxyethylene-sorbitan monooleate, polyoxyethylene-sorbitan trioleate), polyoxyethylene-sorbitol fatty acid esters (e.g., polyoxyethylene-sorbitol tetraoleate), glycerin fatty acid esters (e.g., glycerol monooleate), polyoxyethylene-glycerin fatty acid esters (e.g., polyoxyethylene-glycerin monostearate, polyoxyethylene-glycerin monooleate), polyoxyethylene fatty acid esters (e.g., polyethylene glycol monolaurate, polyoxyethylene glycol monooleate), polyoxyethylene alkylamines, acetylene glycols (e.g., 2,4,7,9-tetramethyl-5-decyne-4,7-diol, and ethylene oxide adducts and propylene oxide adducts of the diols). Preferred are polyoxyalkylene alkyl ethers. The nonionic surfactant may be added to the first and second coating liquids. One or more of these nonionic surfactants may be used herein either singly or in combination.

Examples of the amphoteric surfactant include amino acid compounds, carboxyammonium betaine compounds, sulfonammonium betaine compounds, ammonium sulfate betaine compounds and imidazolium betaine compounds. For example, those described in U.S. Pat. No. 3,843,368, JP-A Nos. 59-49535, 63-236546, 5-303205, 8-262742, 10-282619, Japanese Patent Nos. 2,514,194, 2,759,795, and JP-A No. 2000-351269 are preferably used herein. Of the amphoteric surfactants, more preferred are amino acid compounds, carboxyammonium betaine compounds and sulfonammonium betaine compounds. One or more such amphoteric surfactants may be sued herein either singly or in combination.

Examples of the anionic surfactant include salts of fatty acid (e.g., sodium stearate, potassium oleate), salts of alkylsulfates (e.g., sodium laurylsulfate, triethanolamine laurylsulfate), salts of sulfonic acids (e.g., sodium dodecylbenzenesulfonate), salts of alkylsulfosuccinates (e.g., sodium dioctylsulfosuccinate), salts of alkyldiphenyl ether disulfonates and salts of alkylphosphates.

Examples of the cationic surfactant include alkylamine salts, quaternary ammonium salts, pyridinium salts and imidazolium salts.

Examples of the fluorine-containing surfactant may be a compound derived from a perfluoroalkyl group-having intermediate through electrolytic fluorination, telomerization, oligomerization, or the like.

Examples of the fluorine-containing surfactant include salts of perfluoroalkylsulfonates, salts of perfluoroalkylcarboxylic acids, perfluoroalkyl-ethylene oxide adducts, perfluoroalkyl-trialkylammonium salts, perfluoroalkyl group-having oligomers and perfluoroalkylphosphates.

For the silicone-containing surfactant, preferred is silicone oil modified with an organic group. The side branches of the siloxane structure of the compound may be modified with an organic group; or both ends or one end thereof may be modified with it. Examples of the organic group modification include amino modification, polyether modification, epoxy modification, carboxyl modification, carbinol modification, alkyl modification, aralkyl modification, phenol modification and fluorine modification.

In the invention, the amount of the surfactant to be in the coating liquid for the colorant-receiving layer is preferably from 0.001 to 2.0%, and more preferably from 0.01 to 1.0% with respect to the coating liquid. When two or more coating liquids are used for forming the colorant-receiving layer, it is desirable that the surfactant is added to every coating liquid.

For preventing the inkjet recording sheet from curling, the colorant-receiving layer in the invention preferably includes a high-boiling-point organic solvent. The high-boiling-point organic solvent is an organic compound having a boiling point at normal pressure of 150° C. or more, and it is a water-soluble or hydrophobic compound. The high-boiling-point organic solvent may be liquid or solid at room temperature, and may be a low-molecular weight or high-molecular weight compound.

Specific example thereof include aromatic carboxylates (e.g., dibutyl phthalate, diphenyl phthalate, phenyl benzoate), aliphatic carboxylates (e.g., dioctyl adipate, dibutyl sebacate, methyl stearate, dibutyl maleate, dibutyl fumarate, triethyl acetylcitrate), phosphates (e.g., trioctyl phosphate, tricresyl phosphate), epoxy compounds (e.g., epoxidated soybean oil, methyl esters of epoxidated fatty acids), alcohols (e.g., stearyl alcohol, ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, polyethylene glycol), vegetable oils (e.g., soybean oil, sunflower oil) and higher aliphatic carboxylic acids (e.g., linolic acid, oleic acid).

Support

For the support, any of transparent supports of a transparent material such as plastics, and opaque supports of an opaque material such as paper may be used in the invention. For making the best use of the transparency of the colorant-receiving layer, transparent supports or opaque supports of high glossiness are preferably used.

For the transparent supports, transparent materials that are resistant to radiation heat in OHP or backlight displays are preferred. The materials are, for example, polyesters such as polyethylene terephthalate (PET); and polysulfones, polyphenylene oxides, polyimides, polycarbonates and polyamides. Above all, polyesters are preferred, and polyethylene terephthalate is more preferred.

Though not particularly limited, the thickness of the transparent support is preferably from 50 μm to 200 μm in view of the handleability thereof.

For the opaque supports of high glossiness, those having a glossiness of at least 40% on the surface to be coated with the colorant-receiving layer are preferred. The glossiness is obtained according to the method of ISO 8254-1 (1999) (method of measuring the 75-degree mirror surface glossiness of paper and paper boards). Specifically, the following supports are mentioned.

Example of the support include paper supports of high glossiness, such as art paper, coated paper, cast-coated paper, or baryta paper for silver-salt photographic supports; glossy plastic films of polyesters such as polyethylene terephthalate (PET), cellulose esters such as nitrocellulose, cellulose acetate or cellulose acetate butyrate, polysulfones, polyphenylene oxides, polyimides, polycarbonates or polyamides, which are made opaque by adding a white pigment thereto (their surface may be calendered); and supports prepared by coating the above-mentioned various types of paper supports, transparent supports or white pigment-containing films of high glossiness, with a polyolefin layer containing or not containing a white pigment.

White pigment-containing foamed polyester films (for example, foamed PET containing polyolefin particles and stretched to form pores therein) are also preferred for use herein. In addition, resin-coated paper for silver-salt photographic printing paper is also preferred.

Though not particularly limited, the thickness of the opaque support is preferably from 50 μm to 300 μm in view of the handleability thereof.

The supports may be treated with corona discharge, glow discharge, flames, UV irradiation, or the like for improving the wettability and the adhesiveness thereof.

The base paper for resin-coated paper is described in detail.

The main material of the base paper is wood pulp. Synthetic pulp of polypropylene or the like or synthetic fiber of nylon, polyester or the like is optionally added to the wood pulp, and the mixture may be made into paper. The wood pulp may be any of LBKP, LBSP, NBKP, NBSP, LDP, NDP, LUKP and NUKP, but it is desirable to use a larger amount of LBKP, NBSP LBSP, NDP or LDP containing a large amount of short fiber.

However, the proportion of LBSP and/or LDP in the mixture is preferably from 10% by mass to 70% by mass.

The pulp is preferably chemical pulp (sulfate pulp or sulfite pulp) containing few impurities, and it may be bleached to have an increased degree of whiteness. The bleached pulp is also useful herein.

A sizing agent such as higher fatty acids or alkylketene dimers; a white pigment such as calcium carbonate, talc, or titanium oxide; a paper reinforcing agent such as starch, polyacrylamide, or polyvinyl alcohol; a fluorescent brightener; a water-retaining agent such as polyethylene glycols; a dispersant; a softener such as quaternary ammoniums; or the like may be optionally added to the base paper.

The freeness of the pulp to be made into the base paper is preferably from 200 to 500 ml in terms of CSF. Regarding the fiber length of the pulp after beaten, it is desirable that the total of the 24-mesh residue and the 42-mesh residue defined in JIS P-8207 (a known test method for classification of pulps with screens) is from 30 to 70% by mass. Also preferably, the 4-mesh residue is at most 20% by mass.

The unit mass of the base paper is preferably from 30 to 250 g, and more preferably from 50 to 200 g. The thickness of the base paper is preferably from 40 µm to 250 µm. While or after prepared, the base paper may be calendered to have an increased smoothness. The density of the base paper is generally from 0.7 to 1.2 g/m$^2$ (ISO 534 (1988)).

Further, the toughness of the base paper is preferably from 20 to 200 g under the condition of JIS P-8143 (a known method of determining stiffness of paper (Clark stiffness tester method)).

The surface of the base paper may be coated with a surface-sizing agent. The surface-sizing agent may be the same as that capable of being added to the base paper as above.

The pH of the base paper is preferably from 5 to 9, measured in a hot water extraction method of ISO 1924-2 (1994).

Polyethylene used for coating the face and the back of the base paper is generally a low-density polyethylene (LDPE) and/or a high-density polyethylene (HDPE), but other LLDPE and polypropylene may be partly used.

Preferably, the polyethylene layer on which the colorant-receiving layer is formed includes rutile-type or anatase-type titanium oxide, fluorescent brightener or ultramarine added to polyethylene so as to improve the opacity, the whiteness and the color of the layer, like in most photographic printing paper. The titanium oxide content of the polyethylene layer is preferably from about 3 to 20% by mass, more preferably from 4 to 13% by mass of polyethylene. Though not particularly limited, the thickness of the polyethylene layer is preferably from 10 to 50 µm for both the face and back layers. A subbing layer may be formed on the polyethylene layer for enhancing the adhesion to the colorant-receiving layer. For the subbing layer, aqueous polyesters, gelatin and PVA are preferred. The thickness of the subbing layer is preferably from 0.01 to 5 µm.

The polyethylene-coated paper may be glossy paper, or may be mat or silky paper finely embossed while polyethylene is melt-extruded onto the base paper to coat it, like ordinary photographic printing paper.

On the support, a backcoat layer may be applied, and the backcoat layer may include white pigment, aqueous binder or other components.

Examples of the white pigment that may be in the backcoat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, magnesium hydroxide; and organic pigments such as styrenic plastic pigment, acrylic plastic pigment, polyethylene, urea resin and melamine resin.

Examples of the aqueous binder that may be in the backcoat layer include water-soluble polymers such as styrene/maleic acid salt copolymer, styrene/acrylic acid salt copolymer, polyvinyl alcohol, silanol-modified polyvinyl alcohol, starch, cationated starch, casein, gelatin, carboxymethyl cellulose, hydroxyethyl cellulose, polyvinylpyrrolidone; and water-dispersible polymers such as styrene-butadiene latex, or acrylic emulsion.

Examples of the other components that may be included in the backcoat layer include defoaming agent, antifoaming agent, dye, fluorescent brightener, preservative, and waterproofing agent.

Preparation of Inkjet Recording Sheet In the invention, the colorant-receiving layer may be formed on the inkjet recording sheet in any known coating method, not particularly limited. For it, for example, usable is any of an extrusion die coater, an air doctor coater, a blade coater, a rod coater, a knife coater, a squeeze coater, a reverse roll coater, a bar coater and the like. One colorant-receiving layer may be formed on the support, or a multi-layered colorant-receiving layer may be formed on the support. In addition, the sheet may additionally have an ink solvent absorbent layer, an interlayer, a protective layer or the like. In the invention, the inorganic mordant is included in every colorant-receiving layer or around the ink-receiving face of the sheet.

Specifically, it is desirable that the colorant-receiving layer is formed by applying a first coating liquid (hereinafter this will be referred to as "coating liquid (A1)") that includes at least particles and a water-soluble resin, onto a support, applying a second coating liquid (hereinafter this will be referred to as "coating liquid (B 1)") that includes at least a mordant and has a pH of 7.1 or more, onto the coating layer either (1) simultaneously with the coating or (2) during drying of the coating layer but before it exhibits a falling rate of drying, and crosslinking and curing the coating layer having the second coating liquid applied thereonto (wet-on-wet method). In the method, the inorganic mordant to be in the colorant-receiving layer in the invention is preferably in at least either of the coating liquid (Al) or the coating liquid (B1). It is more preferably in the coating liquid (A1). Also preferably, a crosslinking agent for crosslinking the water-soluble resin is at least in either of the coating liquid (A1) or the coating liquid (B1).

Forming the crosslinked and cured, colorant-receiving layer in the sheet is preferred in view of the ink absorbability and the cracking resistance of the layer.

In the invention, the coating liquid (Al) for forming the colorant-receiving layer that includes at least particles (for example, fumed silica) and a water-soluble resin (e.g., polyvinyl alcohol) may be prepared, for example, as follows.

Particles of fumed silica and a dispersant are added to water (for example, silica particles in water account for from 10 to 20% by mass), dispersed therein with a high-revolution wet colloid mill (e.g., CLEAMIX, trade name, manufactured by M Technic), under a high revolution condition, for example, at 10,000 rpm (preferably from 5,000 to 20,000 rpm) for 20 minutes (preferably from 10 to 30 minutes), then a crosslinking agent (boron compound) and an aqueous polyvinyl alcohol (PVA) solution are added thereto (for example, so that the amount of PVA added may be around ⅓ by mass of the fumed silica), and when the coating liquid for the colorant-receiving layer includes an inorganic mordant of the invention, the mordant is added to it, and this is dispersed under the same revolution condition as previously to prepare the intended coating liquid for the colorant-receiving layer. Thus prepared, the coating liquid is in the form of a uniform sol, and this is applied onto a support according to the coating method mentioned below, and dried to form thereon the intended, porous colorant-receiving layer having a three-dimensional network structure.

For preparing the aqueous dispersion of the above-mentioned fumed silica and dispersant, an aqueous dispersion of the fumed silica is first prepared, and the resultant aqueous dispersion may be added to an aqueous solution of dispersant, or an aqueous solution of dispersant may be added to the aqueous dispersion of fumed silica, or they may be mixed all at a time. If desired, not the aqueous dispersion of fumed silica but the powdery fumed silica itself may be directly added to an aqueous solution of dispersant.

After the fumed silica and the dispersant have been mixed, the resulting mixture is further dispersed by using a disperser to obtain an aqueous dispersion having a mean particle size of from 50 to 300 nm. For obtaining the aqueous dispersion, various conventional dispersing machines such as high-revolution dispersers, medium-assisted stirring dispersers (e.g., ball mills, sand mills), ultrasonic dispersers, colloid mill dispersers and high-pressure dispersers may be used. In the invention, for efficiently dispersing lumps of particles that may be formed, stirring dispersers, colloid mill dispersers or high-pressure dispersers are preferably used.

The solvent in each step may be any of water, an organic solvent or a mixed solvent thereof. Examples of the organic solvent usable for the coating operation include alcohols such as methanol, ethanol, n-propanol, i-propanol and methoxypropanol; ketones such as acetone, methyl ethyl ketone; and tetrahydrofuran, acetonitrile, ethyl acetate and toluene.

For the dispersant, usable are cationic polymers. Examples of the cationic polymers include those mentioned hereinabove for the organic mordant. For the dispersant, also usable are silane coupling agents.

The amount of the dispersant is preferably from 0. 1% to 30%, and more preferably from 1% to 10%, with respect to the particles.

After formed on the support, the colorant-receiving layer may be calendered. For example, using a super calender or gloss calender, it is passed through roll nips under heat and pressure. Thus calendered, the surface smoothness, the glossiness, the transparency and the strength of the layer are increased. However, since the calendering treatment will often lower the porosity of the layer (namely, the ink absorbability of the layer will be lowered), its condition must be so controlled that the porosity of the layer does not much lowered after the calendering treatment.

The roll temperature in the calendering treatment is preferably from 30 to 150° C., and more preferably from 40 to 100° C.

The linear pressure between the rolls in the calendering treatment is preferably from 50 to 400 kg/cm, and more preferably from 100 to 200 kg/cm.

The thickness of the colorant-receiving layer in the case of the inkjet recording is necessarily determined in association with the porosity in a layer because the absorption capacity for absorbing all liquid droplets is necessary. For example, when the amount of ink is 8 nL/mm$^2$ and the porosity of the layer is 60%, the thickness of the layer is about 15 μm or more.

In consideration of the above, the thickness of the colorant-receiving layer in the case of inkjet recording is preferably from 10 to 50 μm.

Preferably, the pore size of the colorant-receiving layer is from 0.005 to 0.030 μm, more preferably from 0.01 to 0.025 μm, in terms of the median diameter thereof.

The porosity and the pore median diameter may be measured with a mercury porosimeter (PORESIZER 9320-PC2, trade name by Shimadzu Corporation).

Preferably, the colorant-receiving layer has high transparency. For its criterion, the haze of the colorant-receiving layer formed on a transparent film support is preferably 30% or more, and more preferably 20% or more.

The haze may be measured with a haze meter (HGM-2DP by Suga Test Instruments Co., Ltd.).

A dispersion of polymer particles may be added to the constitutive layers (e.g., colorant-receiving layer, or back layer) of the inkjet recording sheet in the invention. The dispersion of polymer particles is for improving the physical properties of the coating film, for example, for improving the dimensional stability of the film and for preventing the film from curling, blocking and cracking. The dispersion of polymer particles is described in, for example, JP-A 62-245258, and 10-228076. When a dispersion of polymer particles having a low glass transition temperature (40° C. or less) is added to the mordant-containing layer, then it is effective for preventing the layer from cracking and curling. When a dispersion of polymer particles having a high glass transition point is added to the back layer, it is also effective for preventing the layer from curling.

The inkjet recording sheet in the invention may be produced as well, according to the methods described in JP-A 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091 and 8-2093.

A subbing layer may be formed on the support for enhancing the adhesiveness between the colorant-receiving layer and the support and for suitably controlling the electric resistance of the support.

The colorant-receiving layer may be on one surface of the support, or on both surfaces thereof for preventing curling and deformation of the support. When the colorant-receiving layer is formed on one surface of the support for OHP or the like, an antireflection layer may be formed on the opposite surface or both surfaces of the support for increasing the light transmittance through the support.

Boric acid or a boron compound may be applied onto the surface of the support which is to be coated with the colorant-receiving layer, and then the colorant-receiving layer is formed thereon to ensure the surface glossiness and smoothness of the colorant-receiving layer, whereby the images formed may be prevented from bleeding in high-temperature high-humidity conditions.

Inkjet Recording Method

The system for the inkjet recording method of the invention is not particularly limited, for which any known system is employable. For example, employable is any of a charge control system of jetting out ink through electrostatic attractive force; a drop-on-demand system (pressure pulse system) of using the oscillation pressure of a piezoelectric device; an acoustic inkjet system of converting an electric signal into an acoustic beam, applying it to ink, and jetting out the ink under radiation pressure; or a thermal inkjet system of heating ink to form bubbles and utilizing the resulting pressure. The inkjet recording system includes a system of jetting a large number of small-volume drops of photoink of low concentration, a system of using multiple inks of substantially the same color which, however, differ in concentration to improve the image quality, and a system of using colorless transparent ink.

The exemplary embodiments of the invention are described below.

(1) An inkjet recording method, including: forming an image on an inkjet recording sheet with an ink set, wherein the inkjet recording sheet includes: a support; and a colorant-receiving layer provided on the support, the colorant receiving layer including inorganic particles, a water-soluble resin and at least one boron compound selected from the group consisting of boric acid, a borate and borax, and the ratio of the boron compound to the water-soluble resin in the colorant-receiving layer being from 5 to 14% by mass, wherein the ink set includes at least one inkjet ink including at least the at least one boron compound and a water-soluble dye, and wherein the image is formed on a side of the inkjet recording sheet at which the colorant-receiving layer is formed.

(2) The inkjet recording method according to (1), wherein the ratio of the boron compound to the water-soluble resin in the colorant-receiving layer is from 6 to 12% by mass.

(3) The inkjet recording method according to (1), wherein the ratio of the boron compound to the water-soluble resin in the colorant-receiving layer is from 6 to 10% by mass.

(4) The inkjet recording method according to (1), wherein the boron compound includes boric acid, borax, ammonium borate, lithium borate, hydrated lithium borate, sodium borate, hydrated sodium borate, potassium borate, hydrated potassium borate, hydrated aluminum borate, potassium metaborate, hydrated potassium metaborate, sodium metaborate, hydrated sodium metaborate, hydrated ammonium tetraborate, lithium tetraborate, hydrated lithium tetraborate, hydrated potassium tetraborate, sodium tetraborate, disodium tetraborate, sodium tetraborate, hydrated sodium tetraborate, hydrated ammonium pentaborate or hydrated sodium peroxoborate.

(5) The inkjet recording method according to (1), wherein the amount of the boron compound included in the inkjet ink is from 0.01 to 1% by mass with respect to the inkjet ink.

(6) The inkjet recording method according to (1), wherein the water-soluble dye included in the at least one inkjet ink of the ink set includes a cyan dye represented by the following formula (C-I):

Formula (C-I)

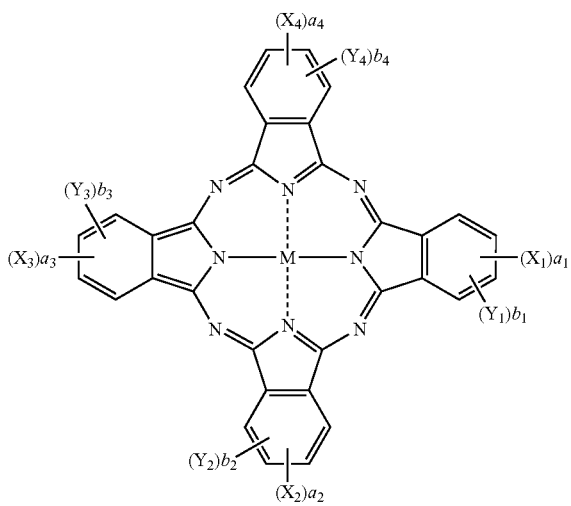

wherein, in Formula (C-I), $X_1$, $X_2$, $X_3$ and $X_4$ each independently represent an electron-attracting group having a Hammett's substituent constant σp of 0.40 or more; $Y_1$, $Y_2$, $Y_3$ and $Y_4$ each independently represent a monovalent substituent; M represents a hydrogen atom, a metal element or an oxide, hydroxide or halide thereof; $a_1$ to $a_4$ respectively represent the number of substituents of $X_1$ to $X_4$; $b_1$ to $b_4$ respectively represent the number of substituents of $Y_1$ to $Y_4$, respectively; $a_1$ to $a_4$ each independently represent an integer of from 0 to 4; $b_1$ to $b_4$ each independently represent an integer of from 0 to 4; and a sum total of the numbers represented by $a_1$ to $a_4$ is 2 or more.

(7) The inkjet recording method according to (1), wherein the amount of the water-soluble dye included in the at least one inkjet ink of the ink set is from 0.1 to 20 parts by mass with respect to 100 parts by mass of the inkjet ink.

(8) The inkjet recording method according to (1), wherein the inorganic particles include at least one selected from the group consisting of vapor-phase silica and pseudo-boehmite.

(9) The inkjet recording method according to (1), wherein the solid content of the inorganic particles in the ink-receiving layer is 50% by mass or more.

(10) The inkjet recording method according to (8), wherein an average primary particle diameter of the vapor-phase silica is 30 nm or less.

(11) The inkjet recording method according to (8), wherein the mean pore radius of the pseudo-boehmite is from 1 to 30 nm.

(12) The inkjet recording method according to (1), wherein the water-soluble resin is selected from the group consisting of polyvinyl alcohol resins, cellulose resins, chitins, chitosans, starches, ether bond-containing resins, and carbamoyl group-containing resins.

(13) The inkjet recording method according to (12), wherein the water-soluble resin includes polyvinyl alcohol, acetoacetyl-modified polyvinyl alcohol, cation-modified polyvinyl alcohol, anion-modified polyvinyl alcohol, silanol-modified polyvinyl alcohol, or polyvinylacetal.

(14) The inkjet recording method according to (12), wherein the water-soluble resin includes polyvinyl alcohol.

(15) The inkjet recording method according to (14), wherein the polyvinyl alcohol has a saponification degree of from 70 to 100%.

(16) The inkjet recording method according to (1), wherein the ratio by mass of the inorganic particles (x) to the water-soluble resin (y), PB ratio x/y, is from 1.5/1 to 10/1.

(17) The inkjet recording method according to (1), wherein the ink-receiving colorant further includes at least one inorganic mordant.

All publications, patent applications, and technical standards mentioned in this specification are herein incorporated by reference to the same extent as if each individual publication, patent application, or technical standard was specifically and individually indicated to be incorporated by reference.

EXAMPLES

Hereinafter, the invention will be described by referring to examples thereof. However, the invention is not intended to limited to these examples. In examples section, "part(s)" represents "part(s) by mass" unless otherwise noted.

Example 1

Preparation of Aqueous Ink
Deionized water was added to the following ingredients to make 1 liter, and stirred for 1 hour under heating at from 30 to 40° C. Next, the pH of the resultant solution was adjusted to 9 with 10 mol/liter of KOH added thereto, and the mixture was filtered under reduced pressure through a 0.25 μm-microfilter to prepare a light magenta ink.

| | |
|---|---|
| Magenta dye represented by the structural formula shown below (Compound M-1): | 7.5 g/L |
| Diethylene glycol: | 50 g/L |
| Urea: | 10 g/L |
| Glycerin: | 200 g/L |
| Triethylene glycol monobutyl ether: | 120 g/L |
| Triethanolamine: | 6.9 g/L |
| Benzotriazole: | 0.08 g/L |
| 2-pyrrolidone: | 20 g/L |
| SURFINOL 465 (trade name, manufactured by Air Products Japan, surfactant): | 10.5 g/L |
| PROXEL XL-2 (trade name, manufactured by ICI Japan, germicide): | 3.5 g/L |
| Boric acid: | 1 g/L |

Subsequently, the dye and the additives were changed as shown in Table 1 to prepare a magenta ink, a light cyan ink, a cyan ink, an yellow ink and a black ink, and an ink set 101 having the composition as shown in Table 1 was prepared.

TABLE 1

(Composition of Ink Set 101)

| | Light Magenta | Magenta | Light Cyan | Cyan | Yellow | Black |
|---|---|---|---|---|---|---|
| Dye (g/L) | Compound M-1 (7.5) | Compound M-1 (30.0) | Compound C-1 (8.75) | Compound C-1 (35.0) | Compound Y-1 (29.0) | Compound Bk-1 (21.5), Compound Bk-2 (5.5) |
| Diethylene glycol (g/L) | 50 | 80 | 170 | 110 | 90 | 10 |
| Urea (g/L) | 10 | 70 | — | — | — | — |
| Glycerin (g/L) | 200 | 150 | 170 | 150 | 150 | 160 |
| Triethylene glycol monobutyl ether (g/L) | 120 | 120 | 130 | 130 | 130 | — |
| Diethylene glycol monobutyl ether (g/L) | — | — | — | — | — | 110 |
| 2-pyrrolidone (g/L) | 20 | — | — | — | — | 50 |
| SURFINOL 465 (g/L) | 10.5 | 10 | 9.8 | 10.5 | — | — |
| SURFINOL STG (g/L) | — | — | — | — | 8.5 | 9.8 |
| Triethanolamine (g/L) | 6.9 | 7 | 6 | 6 | 0.9 | 15 |
| Benzotriazole (g/L) | 0.08 | 0.07 | 0.08 | 0.08 | — | 0.06 |
| PROXEL XL2 (g/L) | 3.5 | 1.5 | 1.1 | 1.2 | 1.5 | 1.1 |
| Boric acid (g/L) | 1 | 1 | 1 | 1 | 1 | 1 |

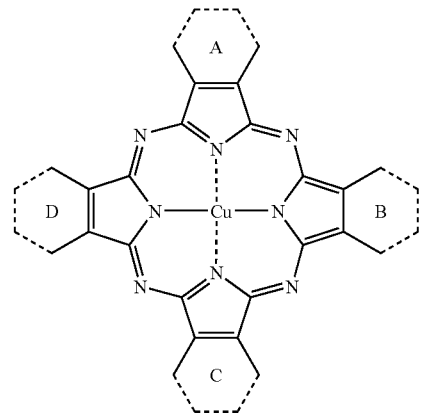

Compound C-1

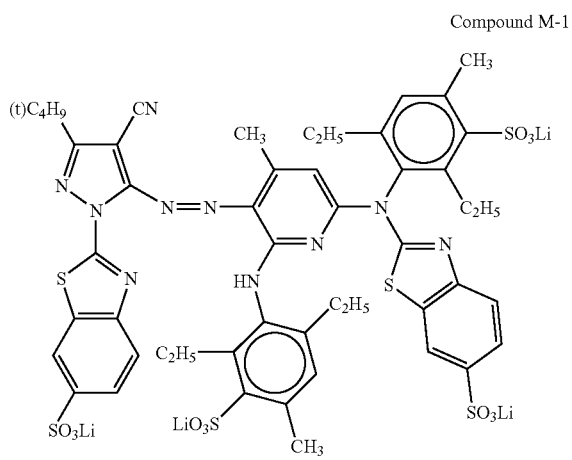

Compound M-1

One of rings A to D represents:

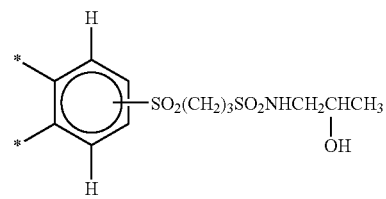

Remaining three rings each represent:

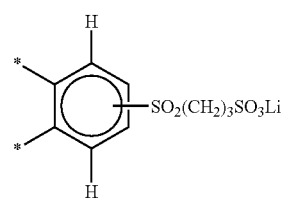

*indicates a bonding site of a phthalocyanine ring.

Compound Y-1

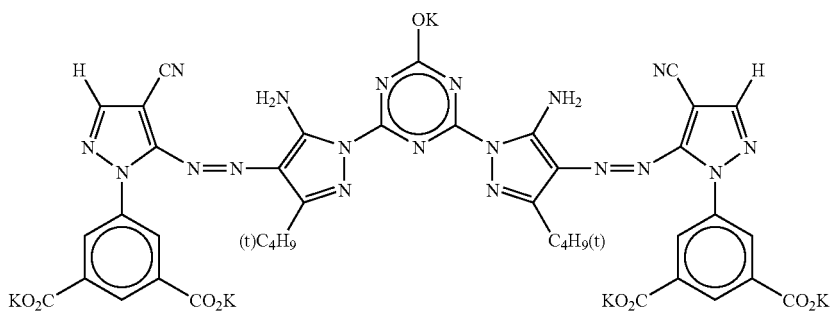

Compound Bk-1

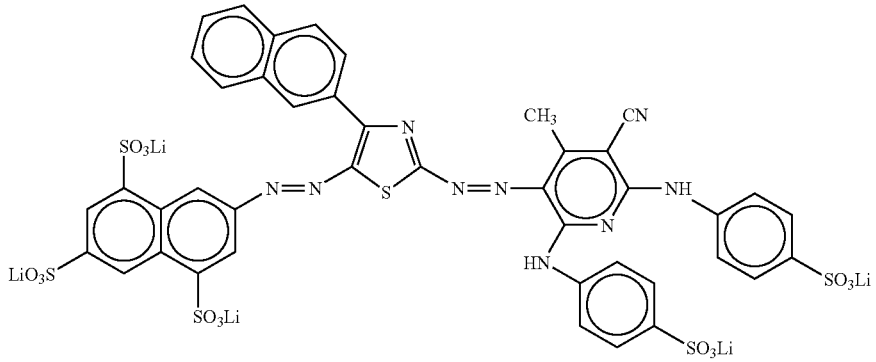

Compound Bk-2

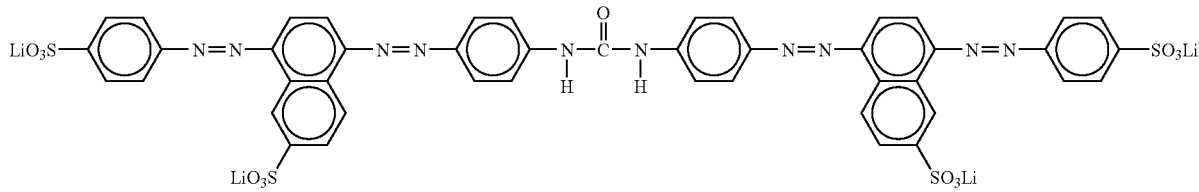

Preparation of Support

In a double disk refiner, wood pulp composed of 100 parts of LBKP was beaten to a Canadian freeness of 300 ml, and 0.5 parts of epoxidized behenic amide, 1.0 part of anion polyacrylamide, 0.1 part of polyamide polyamine epichlorohydrin and 0.5 parts of cation polyacrylamide, all of which amounts are expressed in terms of the mass ratio with respect to an absolute dry mass of the pulp, were added to the pulp and weighed with a fourdrinier machine, whereby a base paper of 170 g/m² was prepared.

To control surface sizing of the base paper, the base paper was impregnated with a 4% polyvinyl alcohol aqueous solution containing 0.04% of a fluorescent whitening agent (trade name: WHITEX BB, manufactured by Sumitomo Chemical Co., Ltd.) so that the base paper has the fluorescent whitening agent in an amount of 0.5 g/m² with respect to an absolute dry mass of the paper. After being dried, the base paper was further calendered to provide the base paper whose density was controlled to be 1.05 g/ml.

The wire-contacted surface (back surface) of the base paper was treated with corona discharge, and then coated with a high-density polyethylene of 19 μm thick, using a melt extruder. A mat resin layer was thus formed on the back surface of the base paper (the resin-coated surface is hereinafter referred to as the "back" of the base paper). The back resin layer was further treated with corona discharge, and an aqueous dispersion of aluminum oxide (ALUMINA SOL 100, trade name, manufactured by Nissan Chemical Industries, Ltd.) and silicon dioxide (SNOWTEX O, registered name, manufactured by Nissan Chemical Industries, Ltd.) in a ratio of 1/2 by mass was applied as an antistatic agent thereto to form a layer having a dry mass of 0.2 g/m².

Further, the felt surface (face) not coated with the resin layer was treated with corona discharge, and a low-density polyethylene containing 10% of anatase titanium dioxide, a minute amount of ultramarine and 0.01% (relative to polyethylene) of a fluorescent brightener and having MFR (melt flow rate) of 3.8 was melt-extruded onto the face, using a melt extruder, to form a layer having a thickness of 40 μm. A glossy thermoplastic resin layer was thus formed on the face of the base paper to prepare a support (the glossy surface is hereinafter referred to as the "face" of the support).

Preparation of Silica Fine Particle Dispersion A-1

In 553 parts of ion exchanged water under agitation at 2000 rpm by a homomixer, 25 parts of vapor-phase silica (average primary particle diameter: 7 nm, specific surface area measured by BET method: 300 m²/g) (hereinafter, may be referred to as "silica") was added, followed by adding 0.33 parts of a prescription amount of dimethyldiallyl ammonium chloride (trade name: SHAROLL DC902P, manufactured by Dai-ichi Kogyo Seiyaku Co., Ltd., 50% aqueous solution). Then, 50 parts of silica was further added thereto, followed by adding 0.67 parts of a prescription amount of dimethyldiallyl ammonium chloride (trade name: SHAROLL DC902P, manufactured by Dai-ichi Kogyo Seiyaku Co., Ltd., 50% aqueous solution), further followed by adding 25 parts of silica. Then, 0.54 parts of zirconyl acetate (trade name: ZIRCOSOL ZA-30, manufactured by DAIICHI KIGENSO KAGAKU KOGYO Co., Ltd.) as an aqueous multivalent metal compound was added and dissolved in the mixture, followed by processing the resultant mixture with a homomixer (trade name: T. K. HOMODISPER, manufactured by Tokushu Kika Kogyo Co., Ltd., 50% aqueous solution) at 4000 rpm at 30° C. for 120 min, whereby a silica preliminary dispersion was prepared. The preliminary dispersion was further subjected to dispersion with a liquid colliding disperser (trade name: ALTIMIZER, manufactured by Sugino Machine Limited) under 130 MPa and one pass, whereby a silica fine dispersion having a silica concentration of about 15% by mass was prepared.

Preparation of Colorant-Receiving Layer Coating Solution A-1

Preparation of Co-dissolved Product of Polyvinyl Alcohol, Diethylene Glycol Monobutyl Ether (BUTYSENOL 20P) and EMULGEN 109P (hereinafter, may be referred to as "PVA co-dissolved product")

The following ingredients were mixed under cooling, and then the mixture was heated to 90° C. to dissolve the ingredients, whereby a PVA co-dissolved product was obtained in this way.

| | |
|---|---|
| Ion exchanged water: | 88.6 parts |
| EMULGEN 109P (trade name, manufactured by Kao Corporation): | 0.23 parts |
| BUTYSENOL 20P (trade name, manufactured by Kyowa Hakko Chemical Co., Ltd.): | 2.1 parts |
| Polyvinyl alcohol (trade name: PVA 235, manufactured by Kuraray Co., Ltd., a saponification degree of 88.5% and a polymerization degree of 3,500): | 7.0 parts |

Subsequently, (2) the solution containing the PVA co-dissolved product obtained above and the following components (3) to (7) were added to the (1) fine silica dispersion A-1 obtained above. The mixture was subjected again to a dispersing treatment for 20 minutes at 2000 rpm with T. K. HOMODISPER (trade name, manufactured by Tokushu Kika Kogyo Co., Ltd.) to prepare an ink-receiving layer coating solution A-I including the following composition.

Composition of Colorant-Receiving Layer Coating Solution A-1

| | |
|---|---|
| (1) Fine silica dispersion liquid A-1: | 58.9 parts |
| (2) Aqueous solution containing 7.61% PVA co-dissolved product (water-soluble resin): | 31.2 parts |
| (3) Boric acid (crosslinking agent): | 0.2 parts |
| (4) Ion exchanged water: | 1.3 parts |
| (5) SUPERFLEX 650 (trade name, manufactured by Dai-ichi Kogyo Seiyaku Co., Ltd.): | 2.2 parts |
| (6) Ethanol: | 0.6 parts |
| (7) Polyaluminum chloride (trade name: ALFINE 83, Taimei Chemicals Co., Ltd.): | 1.3 parts |

Next, the respective components in the following composition were mixed to prepare a mordant coating solution B.
Composition of Mordant Coating Solution B

| | |
|---|---|
| (1) Ammonium carbonate (first-grade reagent, manufactured by Kanto Kagaku): | 5.0 parts |
| (2) Ion exchanged water: | 89.0 parts |
| (3) EMULGEN 109P (trade name, 10% aqueous solution, manufactured by Kao Corporation): | 6.0 parts |

Preparation of Inkjet Recording Sheet

A corona discharge treatment was applied to a front surface of the support obtained above, and the ink-receiving layer coating solution A-1 was applied on the front surface using an extrusion die coater at a coating amount of 175 ml/m$^2$ (coating process). The coated layer was dried at 80° C. (wind velocity: 3 to 8 m/sec) in a hot air dryer until the solid content concentration in the coated layer became 20%. During the drying, the coated layer showed constant-rate drying. The support was immersed in the mordant coating solution B for 3 seconds before the coated layer exhibited a falling rate of drying to adhere 15 g/m$^2$ of the mordant coating solution B on the coated layer, followed by drying at 80° C. for 10 min (curing process). As the result, an inkjet recording sheet having the colorant-receiving layer with a dry film thickness of 35 μm was obtained.

The absorptivity, black density, bronzing and glossiness difference were evaluated for the thus-obtained inkjet recording sheet in accordance with the following methods. The results are shown in Table 2.

Absorptivity The ink set 101 thus prepared was charged in a cartridge of an inkjet printer "PM-A950" (trade name, manufactured by Seiko Epson Corporation), and a black solid image was printed under the conditions of 23° C. and 60% RH. Immediately after printing, a sheet of PPC paper was placed on and moderately pressed against the side on which the black solid printing was applied of the inkjet recording sheet. The degree of transfer of ink to the sheet of PPC paper was visually observed and evaluated according to the following criteria.

A: No transfer of ink was observed.
B: Slight transfer of ink was observed.
C: Significant transfer of ink was observed.

Black Density

The ink set 101 thus prepared was charged in a cartridge of an inkjet printer "PM-A950" (trade name, manufactured by Seiko Epson Corporation), and a black solid image was printed on an inkjet recording sheet and stored under an environment of 23° C. and 60% RH for 24 hr. Thereafter, the black density of the inkjet recording sheet was measured with a reflection densitometer (trade name: XRITE 938, manufactured by X-rite Inc.).

Bronzing

The ink set 101 thus prepared was charged in a cartridge of an inkjet printer "PM-A950" (trade name, manufactured by Seiko Epson Corporation), and a cyan solid image was printed on an inkjet recording sheet under the conditions of 35° C. and 80% RH. The printed inkjet recording sheet was left under an environment of 23° C. and 65% RH for 24 hr. After that, the degree of bronzing was visually observed and evaluated according to the following criteria.

A: No bronzing was observed.
B: Bronzing was observed in part of the surface of the sheet.
C: Bronzing was observed at the entire surface of the sheet.

Difference in Glossiness

The ink set 101 thus prepared was charged into a cartridge of a "PM-A950" inkjet printer (trade name, manufactured by Seiko Epson Corporation), and a black solid image was printed on an inkjet recording sheet under ambient conditions of 30° C. and 80% RH. Thereafter, the difference in glossiness between an image portion and a non-image portion at 60° was evaluated according to the following criteria.

A: Glossiness difference is less than 5, and the glossiness difference causes no sense of incongruity.
B: Glossiness difference is 5 or more and less than 10, and a slight sense of incongruity is caused.

C: Glossiness difference is 10 or more and a sense of incongruity is caused.

Example 2

An ink set and an inkjet recording sheet were prepared in substantially the same manner as in Example 1 except that boric acid included in the inks was changed to borax, and evaluated in substantially the same manner as in Example 1. The results are shown in Table 2.

Example 3

An ink set and an inkjet recording sheet were prepared in substantially the same manner as in Example 1 except that boric acid included in the inks was changed to lithium borate and evaluated in substantially the same manner as in Example 1. The results are shown in Table 2.

Example 4

Preparation of Pseudo-boehmite Alumina Dispersion

A crude pseudo-boehmite alumina dispersion was obtained by adding 708 g of pseudo-boehmite alumina (trade name: CATALOID AP-5, manufactured by Shokubai Kasei Kogyo Co., Ltd., primary particle diameter: 8 nm) in 2,042 g of ion exchanged water under agitation with a dissolver. Rotation frequency of the dissolver was 3,000 rpm and rotation time was 10 minutes.

Then, the crude alumina dispersion liquid was finely dispersed using a high pressure disperser (trade name: ALTIMIZER HJP25005, manufactured by Sugino Machine K.K.) to obtain a white-colored transparent pseudo boehmite alumina dispersion having a solid content of 25%. In the dispersing treatment, the pressure was set at 100 MPa and the discharge amount was set at 600 g/min.

The average particle diameter (average particle diameter of secondary particles) of the resultant pseudo-boehmite alumina dispersion was 0.06 μm. The average particle diameter was measured by dynamic optical scattering method at a liquid temperature of 30° C. of a solution obtained by diluting the pseudo-boehmite alumina dispersion with ion exchanged water to an appropriate concentration. As a measurement device, LB-500 (trade name, manufactured by Horiba, Ltd.,) was used.

Preparation of Vapor-Phase Silica Dispersion

First, while agitating 3,365 g of ion exchanged water with a dissolver, 35 g of an acrylate cation polymer (trade name: CHEMISTAT 7005, manufactured by Sanyo Chemical Industries, Ltd., I/O value =1.89) as an organic cation polymer was added, and then 600 g of vapor-phase silica (trade name: AEROSIL 300, manufactured by Nippon Aerosil Co., Ltd., primary particle diameter: 7 nm) was added, whereby a crude vapor-phase silica dispersion was obtained. At this time, the rotation frequency of the dissolver was set at 3,000 rpm and the rotation time was set at 10 min.

Then, the crude vapor-phase silica dispersion was finely dispersed using a high pressure disperser (trade name: ALTIMIZER HJP25005, manufactured by Sugino Machine K.K.) to obtain a white-colored transparent vapor-phase silica dispersion having a solid content of 15%. In the dispersing treatment, the pressure was set at 100 MPa and the discharge amount was set at 600 g/min.

The average particle diameter (average particle diameter of secondary particles) of the resultant vapor-phase silica dispersion was 0.1040 μm. The average particle diameter was measured by dynamic optical scattering method at a liquid temperature of 30° C. of a solution obtained by diluting the silica dispersion with ion exchanged water to an appropriate concentration. As a measurement device, LB-500 (trade name, manufactured by Horiba, Ltd.,) was used.

Preparation of Colorant-Receiving Layer Forming Coating Solution

Coating Solution forforming Top Layer (First Colorant-Receiving Layer Forming Coating Solution)

First, 1,012.5 g of the pseudo-boehmite alumina dispersion, 405 g of ion exchanged water, 97.1 g of 7.5% boric acid aqueous solution, 346.7 g of an aqueous solution of 7% polyvinyl alcohol (trade name: PVA245, manufactured by Kuraray Co., Ltd.) having the saponification degree of 88% and polymerization degree of 4,500 and 11.4 g of a 10% surfactant aqueous solution (trade name: SWANOL AM2150, manufactured by Nikko Chemicals), respectively, were kept at 60° C., followed by mixing, whereby a coating solution for forming a colorant-receiving layer (colorant-receiving layer forming coating solution) containing pseudo-boehmite alumina was obtained as a coating solution for forming a top layer (top layer forming coating solution).

Coating Solution for form ing Bottom Layer (Second Colorant-Receiving Layer Forming Coating Solution)

First, 892.2 g of the vapor-phase silica dispersion, 467.4 g of an aqueous solution of 7% polyvinyl alcohol (trade name: PVA245, manufactured by Kuraray Co., Ltd.) having the saponification degree of 88% and polymerization degree of 4,500, 11.4 g of a 10% surfactant aqueous solution (trade name: SWANOL AM2150, manufactured by Nikko Chemicals), 84.2 g of ion exchanged water and 160 g of 59% AP-7 (trade name, manufactured by Nippon Alcohols, industrial use ethanol), respectively, were kept at 30° C. before mixing. The respective solutions were thoroughly mixed while keeping at 30° C., whereby a coating solution for forming a colorant-receiving layer (colorant-receiving layer forming coating solution) containing vapor-phase silica was obtained as a coating solution for forming a bottom layer (bottom layer forming coating solution).

Preparation of Support

A mixture of a leaf bleached kraft pulp (LBKP) and a needle-leaf bleached sulfite pulp (NBSP) with a weight ratio of 1:1 was subjected to beating to Canadian freeness of 300 ml, to prepare a pulp slurry. To the slurry, alkyl ketene dimer as a sizing agent in an amount of 0.5%, polyacrylamide in an amount of 1.0% as a strengthening additive of paper, cationic starch in an amount of 2.0%, and a polyamide epichlorohydrin resin in an amount of 0.5%, with respect to the mass of the pulp, were added, and the mixture was diluted with water to prepare a 1% slurry. This slurry was made into paper by a fourdrinier paper machine to have a basis weight of 170 g/m$^2$, dried and subjected to moisture conditioning to prepare a base paper for a polyolefin resin-coated paper. A polyethylene resin composition containing 100% of a low density polyethylene having a density of 0.918 g/cm$^3$ and 10% of anatase titanium oxide dispersed uniformly in the resin was melted at 320° C., and the melted resin composition was applied by extrusion coating on a surface of the base paper at a thickness of 35 μm at 200 m/min. Then, the coated base paper was subjected to extrusion coating with a cooling roller subjected to slightly roughening treatment. On the other surface of the base paper, a blended resin composition containing 70 parts by mass of a high-density polyethylene resin having a density of 0.962 g/cm$^3$ and 30 parts by mass of a low-density polyethylene resin having a density of 0.918 g/cm$^3$ was melted similarly at 320° C., and the melted resin composition was applied by extrusion coating at a thickness of 30 μm on the other surface of the base paper. Then, the coated base paper was subjected to extrusion coating with a cooling roller subjected to roughening treatment.

After a surface of the resultant polyolefin resin-coated paper was subjected to a high frequency corona discharge treatment, an undercoat layer having a composition shown below was formed so that a gelatin amount may be 50 mg/m², whereby a support was prepared.

Undercoat Layer

| Lime-treated gelatin: | 100 parts |
| 2-Ethylhexyl sulfosuccinate: | 2 parts |
| Chromium alum: | 10 parts |

Preparation of Inkjet Recording Sheet

The top layer forming coating solution and the bottom layer forming coating solution respectively kept at 45° C. were multilayer-coated simultaneously with a slide-bead coating machine on the support on which the undercoat layer was formed. The resultant coated layers were cooled for 30 sec under drying conditions that make a film surface temperature of the coated layer less than 20° C. during drying, specifically, that make the film surface temperature of the coated layer 12° C., followed by drying under drying conditions of 45° C. and 10% RH until a total solid content concentration becomes 90% by mass, further followed by drying under drying conditions of 35° C. and 10% RH, whereby an inkjet recording sheet was prepared.

At this time, the top layer was coated so that the coating amount of the pseudo-boehmite alumina was 20 g/m² in terms of solid content, and the bottom layer was coated so that the coating amount of the vapor-phase silica was 9.0 g/m² in terms of solid content.

The evaluation was performed in substantially the same manner as in Example 2 except that the thus-obtained inkjet recording sheet was used. The results are shown in Table 2.

Example 5

An inkjet recording sheet was prepared in substantially the same manner as in Example 1 except that the polyvinyl alcohol "PVA 235" used in "Preparation of Colorant-Receiving Layer Coating Solution A-1" in Example 1 was changed to "JM-33" (trade name, manufactured by Japan VAM & POVAL Co., Ltd.) having the saponification degree of 95% by mol and polymerization degree of 3,300. The evaluation was performed in substantially the same manner as in Example 2 except that the thus-obtained inkjet recording sheet was used. Obtained results are shown in Table 2.

Example 6

An inkjet recording sheet was prepared in substantially the same manner as in Example 1 except that the amount of boric acid in "Preparation of Colorant-Receiving Layer Coating Solution A-1" was changed 0.15 parts. The evaluation was performed in substantially the same manner as in Example 2 except that the thus-obtained inkjet recording sheet was used. The results are shown in Table 2.

Example 7

An inkjet recording sheet was prepared in substantially the same manner as in Example 1 except that the amount of boric acid in "Preparation of Colorant-Receiving Layer Coating Solution A-1" was changed 0.3 parts. The evaluation was performed in substantially the same manner as in Example 2 except that the thus-obtained inkjet recording sheet was used. The results are shown in Table 2.

Comparative Example 1

An ink set and an inkjet recording sheet were prepared in substantially the same manner as in Example 1 except that boric acid was not added to the inks and evaluated in the same manner as in Example 1. The results are shown in Table 3.

Comparative Example 2

An inkjet recording sheet was prepared in substantially the same manner as in Example 1 except that the colorant-receiving layer coating solution A-1 (coating amount of 175 ml/m²) was changed to a colorant-receiving layer coating solution A-2 (coating amount of 110 ml/m²) described below. The evaluation was performed in substantially the same manner as in Example 2 except that the thus-obtained inkjet recording sheet was used. The results are shown in Table 3.

Composition of Colorant-Receiving Layer Coating Solution A-2

| PVA co-dissolved product (water-soluble resin) 7.61% aqueous solution: | 50 parts |
| Ion exchanged water: | 50 parts |

Comparative Example 3

An inkjet recording sheet was prepared in substantially the same manner as in Example 1 except that the amount of boric acid in "Preparation of Colorant-Receiving Layer Coating Solution A-1" was changed to 0.4 parts. The evaluation was performed in substantially the same manner as in Example 2 except that the thus-obtained inkjet recording sheet was used. The results are shown in Table 3.

Comparative Example 4

Preparation of Polyolefin Resin-coated Paper Support

A mixture of a leaf bleached kraft pulp (LBKP) and a needle-leaf bleached sulfite pulp (NBSP) with a weight ratio of 1:1 was subjected to beating to Canadian freeness 300 ml to prepare a pulp slurry. To the slurry, alkyl ketene dimer in an amount of 0.5% by mass as a sizing agent, polyacrylamide in an amount of 1.0% by mass as a strengthening additive of paper, cationic starch in an amount of 2.0% by mass, and a polyamide epichlorohydrin resin in an amount of 0.5% by mass, with respect to the mass of the pulp, were added, and the mixture was diluted with water to prepare a 1% slurry. The slurry was made into paper by a fourdrinier paper machine to have a basis weight of 120 g/m², dried and subjected to moisture conditioning to prepare a base paper for a polyolefin resin-coated paper. A polyethylene resin composition containing 100 parts by mass of a low density polyethylene having a density of 0.918 g/cm³ and 10 parts by mass of anatase titanium oxide dispersed uniformly in the resin was melted at 320° C., and the melted resin composition was applied by extrusion coating at a thickness of 35 μm at 200 m/min on the base paper. Then, the paper was subjected to extrusion coating with a cooling roller subjected to slightly roughening treatment. On the other surface of the base paper, a blended resin composition containing 70 parts by mass of a high density polyethylene resin having a density of 0.962 g/cm³ and 30 parts by mass of a low density polyethylene resin having a density of 0.918 g/cm³ was melted similarly at 320° C., and the melted resin composition was applied by extrusion coating at a thickness of 30 μm on the other surface of the base paper. Then, the paper was subjected to extrusion coating by use of a cooling roller subjected to roughening treatment.

After a surface of the resultant polyolefin resin-coated paper was subjected to a high frequency corona discharge treatment, an undercoat layer having a composition described below was applied and dried so that a gelatin amount of the undercoat layer may be 50 mg/m², whereby a support was prepared.

Undercoat Layer

| | |
|---|---|
| Lime-treated gelatin: | 100 parts |
| 2-Ethylhexyl sulfosuccinate: | 2 parts |
| Chromium alum: | 10 parts |

A colorant-receiving layer coating solution having the following composition was applied on the support with a slide coating machine and dried. The colorant-receiving layer coating solution was prepared so that the solid content concentration of vapor-phase silica may be 9% by mass in the coating solution. The coating solution was applied so that a coating amount of vapor-phase silica was 19 g/m² in terms of solid content and dried, whereby an inkjet recording sheet was prepared. The inkjet recording sheet was evaluated in substantially the same manner as in Example 2 except that the thus-obtained inkjet recording sheet was used. The results are shown in Table 3.

Colorant-Receiving Layer Composition

| | |
|---|---|
| Vapor-phase silica (average primary particle diameter: 7 nm, specific surface area measured by BET method: 300 m²/g): | 100 parts |
| Dimethyldiallyl ammonium chloride homopolymer (trade name: SHAROL DC902P, manufactured by Dai-ichi Kogyo Seiyaku Co., Ltd., molecular weight: 9000): | 4 parts |
| Boric acid: | 3 parts |
| Polyvinyl alcohol (saponification degree: 88%, average polymerization degree: 3,500): | 20 parts |
| Zinc phenolsulfonate: | 3 parts |
| 3,6-dithio-1,8-octanediol: | 5 parts |

Comparative Example 5

An inkjet recording sheet was prepared in substantially the same manner as in Example 1 except that the amount of boric acid in "Preparation of Colorant-Receiving Layer Coating Solution A-1" was changed to 0.1 parts. The evaluation was performed in substantially the same manner as in Example 2 except that the thus-obtained inkjet recording sheet was used. The results are shown in Table 3.

TABLE 2

| | Example 1 | Example 2 | Example 3 | Example 4 | Example 5 | Example 6 | Example 7 |
|---|---|---|---|---|---|---|---|
| Ink | Boric acid | Borax | Lithium borate | Borax | Borax | Borax | Borax |
| Ink-receiving layer | Vapor-phase silica | Vapor-phase silica | Vapor-phase silica | Pseudo-boehmite | Vapor-phase silica | Vapor-phase silica | Vapor-phase silica |
| | PVA235 | PVA235 | PVA235 | PVA245 | JM33 | PVA235 | PVA235 |
| | Boric acid/PVA = 9.2% by mass | Boric acid/PVA = 9.2% by mass | Boric acid/PVA = 9.2% by mass | Boric acid/PVA = 9.2% by mass | Boric acid/PVA = 9.2% by mass | Boric acid/PVA = 6.9% by mass | Boric acid/PVA = 13.8% by mass |
| Absorptivity | A | A | A | A | A | A | A |
| Black density | 2.3 | 2.32 | 2.31 | 2.7 | 2.22 | 2.25 | 2.35 |
| Bronzing | A | A | A | B | A | A | A |
| Glossiness difference | A | A | A | A | A | A | B |

TABLE 3

| | Comparative Example 1 | Comparative Example 2 | Comparative Example 3 | Comparative Example 4 | Comparative Example 5 |
|---|---|---|---|---|---|
| Ink | No boron compound | Borax | Borax | Borax | Borax |
| Ink-receiving layer | Vapor-phase silica | None | Vapor-phase silica | Vapor-phase silica | Vapor-phase silica |
| | PVA235 | PVA235 | PVA235 | PVA235 | PVA235 |
| | Boric acid/PVA = 9.2% by mass | Boric acid/PVA = 0.0% by mass | Boric acid/PVA = 18.3% by mass | 15.0% by mass | 4.6% by mass |
| Absorptivity | A | C | A | A | B |
| Black density | 2.1 | — | 2.2 | 2.25 | 2.15 |
| Bronzing | C | C | A | A | B |
| Glossiness difference | C | — | C | C | A |

What is claimed is:

1. An inkjet recording method, comprising: forming an image on an inkjet recording sheet with an ink set, wherein:
the inkjet recording sheet comprises: a support; and a colorant-receiving layer provided on the support, the colorant receiving layer comprising inorganic particles, a water-soluble resin and at least one boron compound selected from the group consisting of boric acid, a borate and borax, and the ratio of the boron compound to the water-soluable resin in the colorant-receiving layer being from 5 to 14% by mass,
the ink set comprises at least one inkjet ink including at least the at least one boron compound and a water-soluble dye,
the image is formed on a side of the inkjet recording sheet at which the colorant-receiving layer is formed, and
the amount of the boron compound included in the inkjet ink is from 0.01 to 1% by mass with respect to the inkjet ink.

2. The inkjet recording method according to claim 1, wherein the ratio of the boron compound to the water-soluble resin in the colorant-receiving layer is from 6 to 12% by mass.

3. The inkjet recording method according to claim 1, wherein the ratio of the boron compound to the water-soluble resin in the colorant-receiving layer is from 6 to 10% by mass.

4. The inkjet recording method according to claim 1, wherein the boron compound comprises boric acid, borax, ammonium borate, lithium borate, hydrated lithium borate, sodium borate, hydrated sodium borate, potassium borate, hydrated potassium borate, hydrated aluminum borate, potassium metaborate, hydrated potassium metaborate, sodium metaborate, hydrated sodium metaborate, hydrated ammonium tetraborate, lithium tetraborate, hydrated lithium tetraborate, hydrated potassium tetraborate, sodium tetraborate, disodium tetraborate, sodium tetraborate, hydrated sodium tetraborate, hydrated ammonium pentaborate or hydrated sodium peroxoborate.

5. The inkjet recording method according to claim 1, wherein the water-soluble dye included in the at least one inkjet ink of the ink set comprises a cyan dye represented by the following formula (C-I):

Formula (C-I)

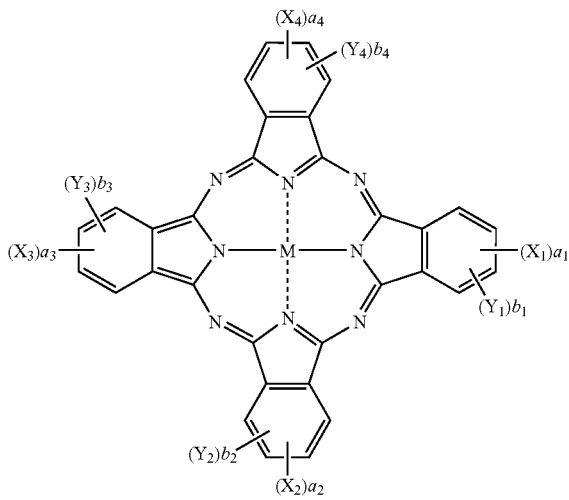

wherein, in Formula (C-I), $X_1$, $X_2$, $X_3$ and $X_4$ each independently represent an electron-attracting group having a Hammett's substituent constant σp of 0.40 or more; $Y_1$, $Y_2$, $Y_3$ and $Y_4$ each independently represent a monovalent substituent; M represents a hydrogen atom, a metal element or an oxide, hydroxide or halide thereof; $a_1$ to $a_4$ respectively represent the number of substituents of $X_1$ to $X_4$; $b_1$ to $b_4$ respectively represent the number of substituents of $Y_1$ to $Y_4$, respectively; $a_1$ to $a_4$ each independently represent an integer of from 0 to 4; $b_1$ to $b_4$ each independently represent an integer of from 0 to 4; and a sum total of the numbers represented by $a_1$ to $a_4$ is 2 or more.

6. The inkjet recording method according to claim 1, wherein the amount of the water-soluble dye included in the at least one inkjet ink of the ink set is from 0.1 to 20 parts by mass with respect to 100 parts by mass of the inkjet ink.

7. The inkjet recording method according to claim 1, wherein the inorganic particles comprise at least one selected from the group consisting of vapor-phase silica and pseudo-boehmite.

8. The inkjet recording method according to claim 7, wherein an average primary particle diameter of the vapor-phase silica is 30 nm or less.

9. The inkjet recording method according to claim 7, wherein the mean pore radius of the pseudo-boehmite is from 1 to 30 nm.

10. The inkjet recording method according to claim 1, wherein the solid content of the inorganic particles in the ink-receiving layer is 50% by mass or more.

11. The inkjet recording method according to claim 1, wherein the water-soluble resin is selected from the group consisting of polyvinyl alcohol resins, cellulose resins, chitins, chitosans, starches, ether bond-containing resins, and carbamoyl group-containing resins.

12. The inkjet recording method according to claim 11, wherein the water-soluble resin comprises polyvinyl alcohol, acetoacetyl-modified polyvinyl alcohol, cation-modified polyvinyl alcohol, anion-modified polyvinyl alcohol, silanol-modified polyvinyl alcohol, or polyvinylacetal.

13. The inkjet recording method according to claim 11, wherein the water-soluble resin comprises polyvinyl alcohol.

14. The inkjet recording method according to claim 13, wherein the polyvinyl alcohol has a saponification degree of from 70 to 100%.

15. The inkjet recording method according to claim 1, wherein the ratio by mass of the inorganic particles (x) to the water-soluble resin (y), PB ratio x/y, is from 1.5/1 to 10/1.

16. The inkjet recording method according to claim 1, wherein the colorant-receiving layer further comprises at least one inorganic mordant.

* * * * *